(12) United States Patent
Hoff et al.

(10) Patent No.: US 12,308,474 B2
(45) Date of Patent: May 20, 2025

(54) GRID ENERGY STORAGE SYSTEM FEATURING MASSIVELY PARALLEL-CONNECTED CELLS

(71) Applicant: American Energy Storage Innovations, Inc., Hudson, MA (US)

(72) Inventors: C. Michael Hoff, Boxborough, MA (US); Greg Tremelling, Berlin, MA (US); Bud Collins, Berlin, MA (US); Scott H. Reitsma, Shrewsbury, MA (US); Erik Nelson, Upton, MA (US)

(73) Assignee: American Energy Storage Innovations, Inc., Hudson, MA (US)

( * ) Notice: Subject to any disclaimer, the term of this patent is extended or adjusted under 35 U.S.C. 154(b) by 10 days.

(21) Appl. No.: 18/263,425

(22) PCT Filed: Jan. 27, 2022

(86) PCT No.: PCT/US2022/014092
§ 371 (c)(1),
(2) Date: Jul. 28, 2023

(87) PCT Pub. No.: WO2022/165028
PCT Pub. Date: Aug. 4, 2022

(65) Prior Publication Data
US 2024/0088524 A1    Mar. 14, 2024

Related U.S. Application Data

(60) Provisional application No. 63/143,007, filed on Jan. 28, 2021.

(51) Int. Cl.
*H01M 50/509*     (2021.01)
*H01M 10/42*     (2006.01)
(Continued)

(52) U.S. Cl.
CPC ....... *H01M 50/509* (2021.01); *H01M 10/425* (2013.01); *H01M 10/613* (2015.04);
(Continued)

(58) Field of Classification Search
CPC ............. H01M 50/509; H01M 10/613; H01M 10/627; H01M 10/6567; H01M 50/209
See application file for complete search history.

(56) References Cited

U.S. PATENT DOCUMENTS

| | | |
|---|---|---|
| 2009/0234705 A1 | 9/2009 | Brunschwiler et al. |
| 2013/0316198 A1 | 11/2013 | Bandhauer et al. |

(Continued)

FOREIGN PATENT DOCUMENTS

CN      109075370 A    12/2018

OTHER PUBLICATIONS

International Search Report for PCT/US2022/014092, dated May 3, 2022, 4 pages.

(Continued)

*Primary Examiner* — Olatunji A Godo
(74) *Attorney, Agent, or Firm* — Hamilton, Brook, Smith & Reynolds, P.C.

(57) ABSTRACT

A system architecture for grid electrical energy storage comprising substantial numbers of cells connected in parallel. The lowest level of modularity comprising about eighteen or more individual cells connected in parallel. The disclosed architecture reduces the number of parts, complexity, and variability, while increasing one or more of reliability, service life, and energy capacity of a large-scale grid energy storage system, relative to a conventional multi-parallel string architecture.

17 Claims, 27 Drawing Sheets

(51) Int. Cl.
  *H01M 10/613* (2014.01)
  *H01M 10/627* (2014.01)
  *H01M 10/6567* (2014.01)
  *H01M 50/209* (2021.01)
  *H01M 50/383* (2021.01)
  *H01M 50/583* (2021.01)

(52) U.S. Cl.
  CPC ..... *H01M 10/627* (2015.04); *H01M 10/6567* (2015.04); *H01M 50/209* (2021.01); *H01M 50/383* (2021.01); *H01M 50/583* (2021.01); *H01M 2010/4271* (2013.01); *H01M 2010/4278* (2013.01); *H01M 2220/10* (2013.01)

(56) References Cited

U.S. PATENT DOCUMENTS

| | | |
|---|---|---|
| 2014/0265565 A1 | 9/2014 | Cooley et al. |
| 2016/0301038 A1 | 10/2016 | Modest et al. |
| 2016/0336623 A1 | 11/2016 | Nayar et al. |
| 2021/0119514 A1* | 4/2021 | Cox ................... H02K 11/0094 |

OTHER PUBLICATIONS

Written Opinion of the International Searching Authority, PCT/US2022/014092, dated May 3, 2022, 6 pages.

Cooper Bussmann. "Overcurrent Protection And The 2002 National Electrical Code" pp. 1-66. Cooper Bussmann. Online. Mar. 2002; [retrieved Apr. 18, 2022). Retrieved from the Internet: <https://nanopdf.com/queue/ne02_pdf?queue_id=1&x=1650275296&z=MzUuMTYzLjExMi4xNT=>.

* cited by examiner

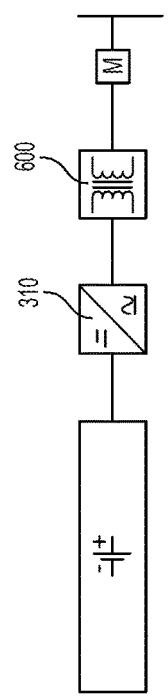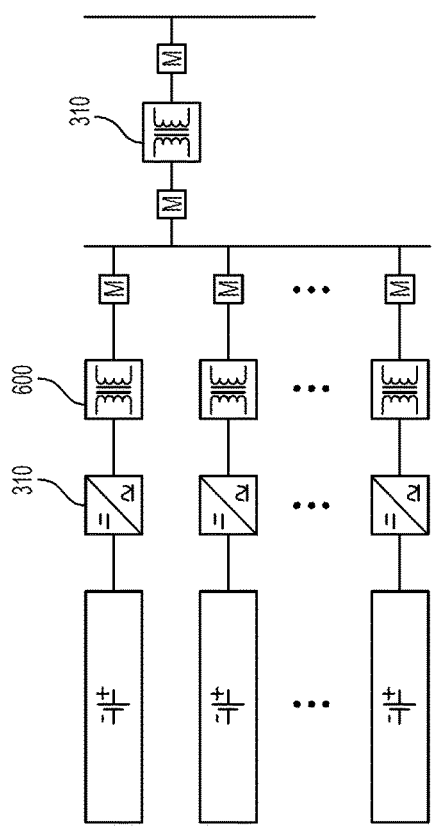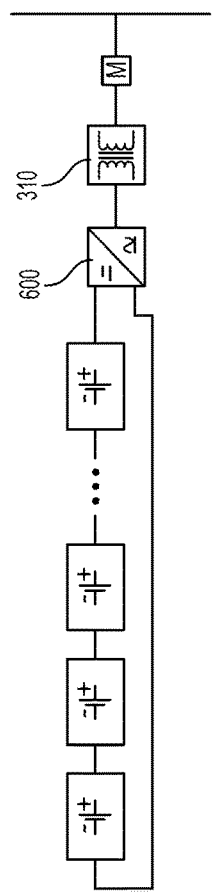

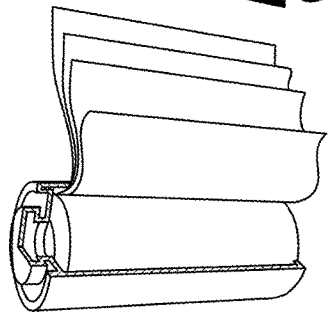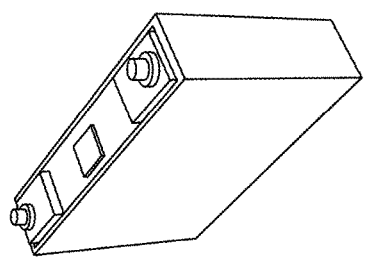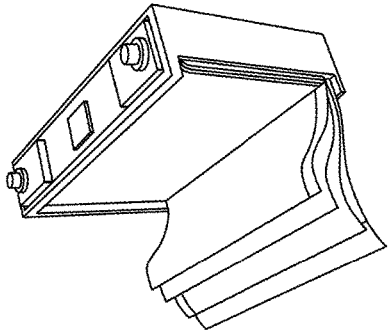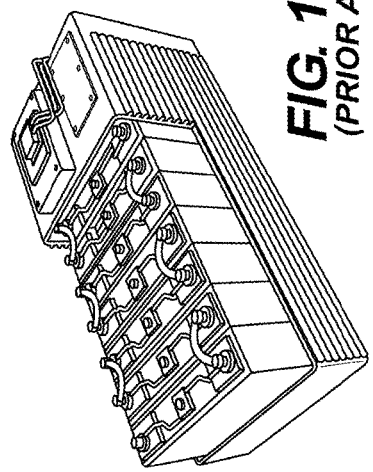
FIG. 11A (PRIOR ART)
FIG. 11B (PRIOR ART)
FIG. 11C (PRIOR ART)
FIG. 11D (PRIOR ART)

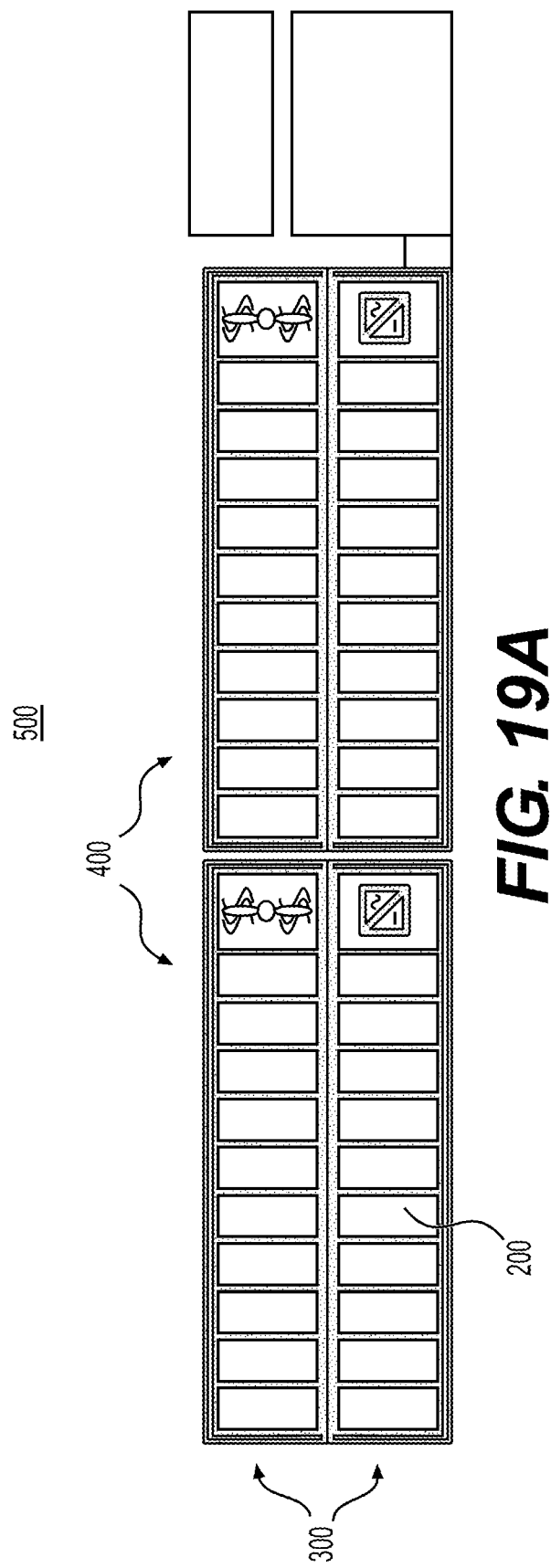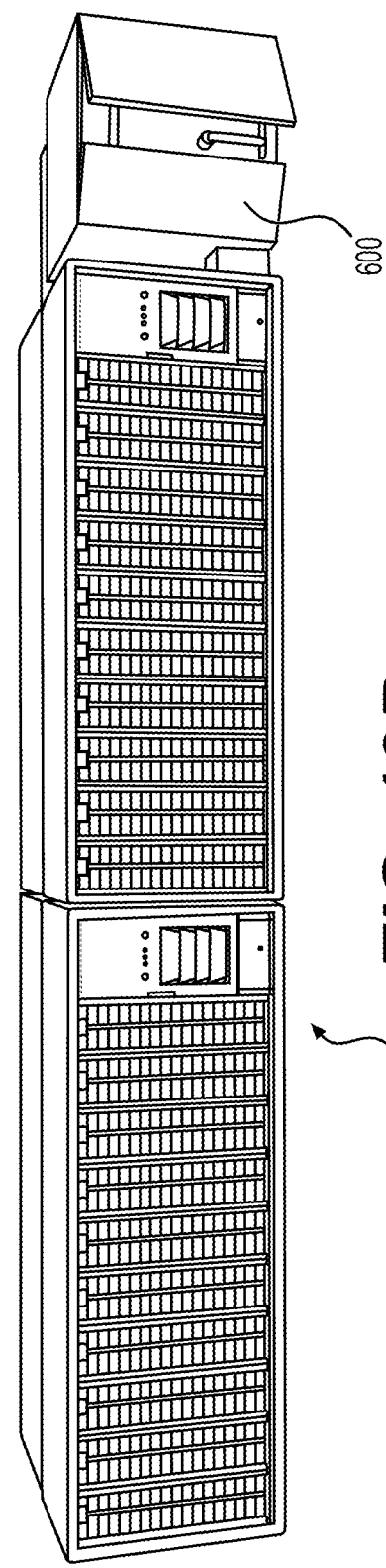
FIG. 19A
FIG. 19B

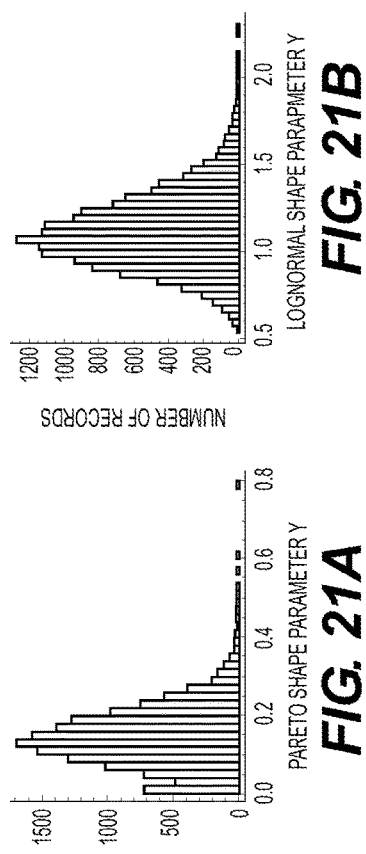
FIG. 21A
FIG. 21B
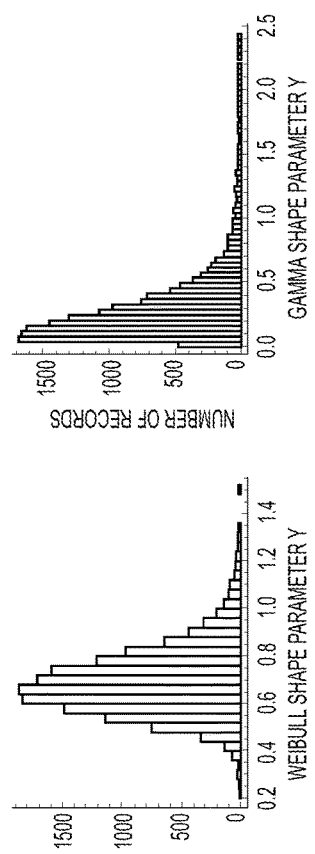
FIG. 21C
FIG. 21D
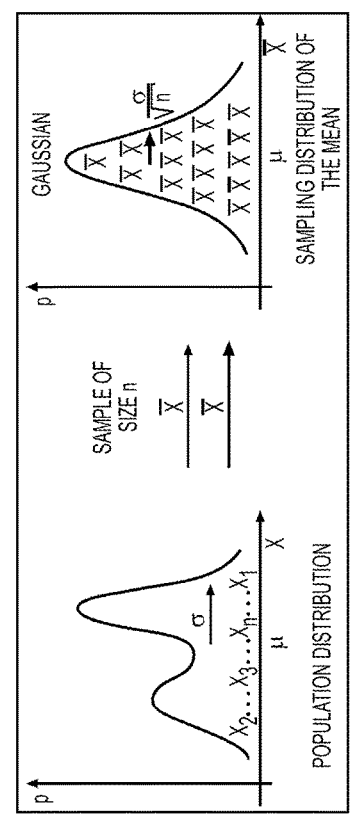
FIG. 22A
FIG. 22B

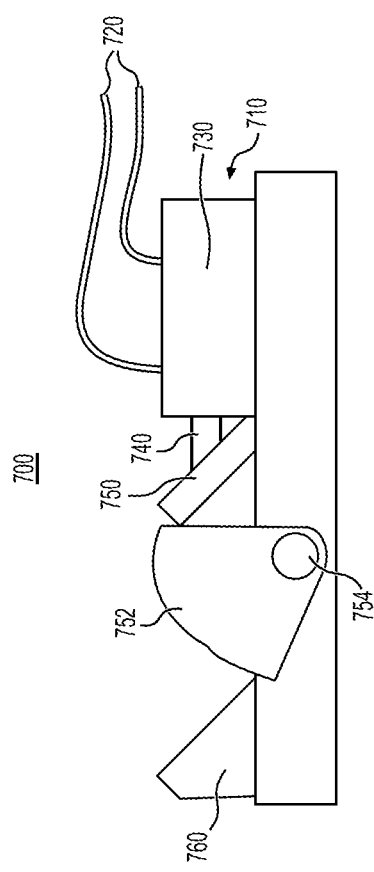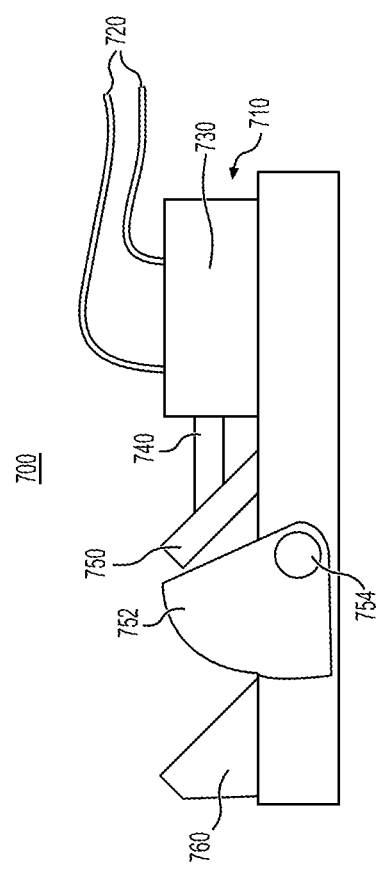

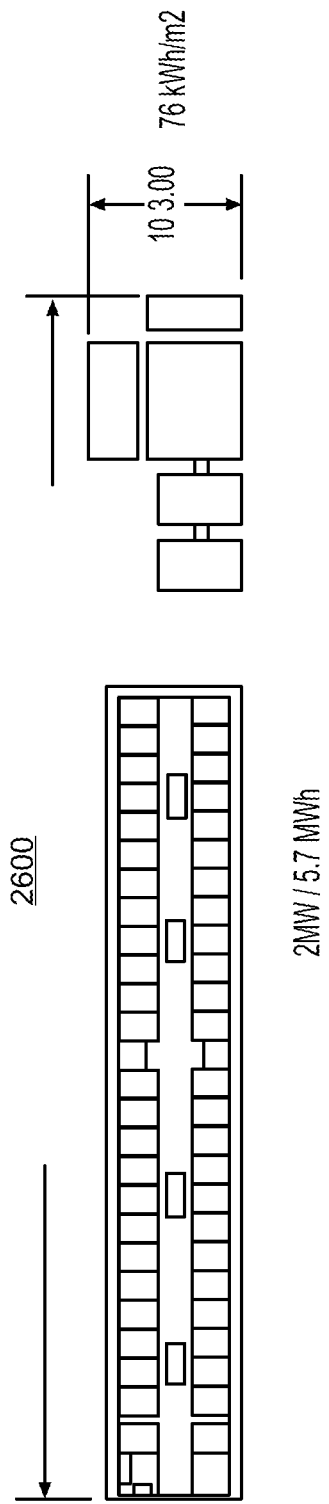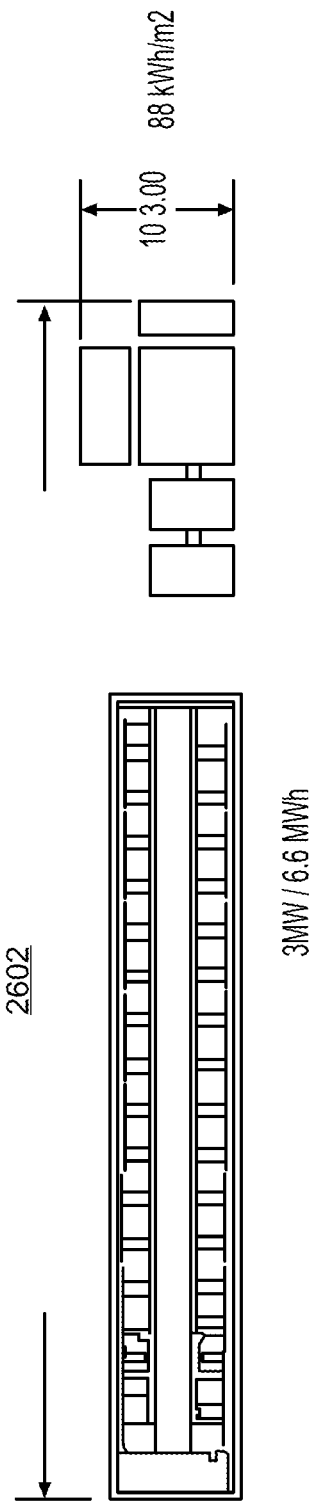
FIG. 26A (PRIOR ART)
FIG. 26B (PRIOR ART)

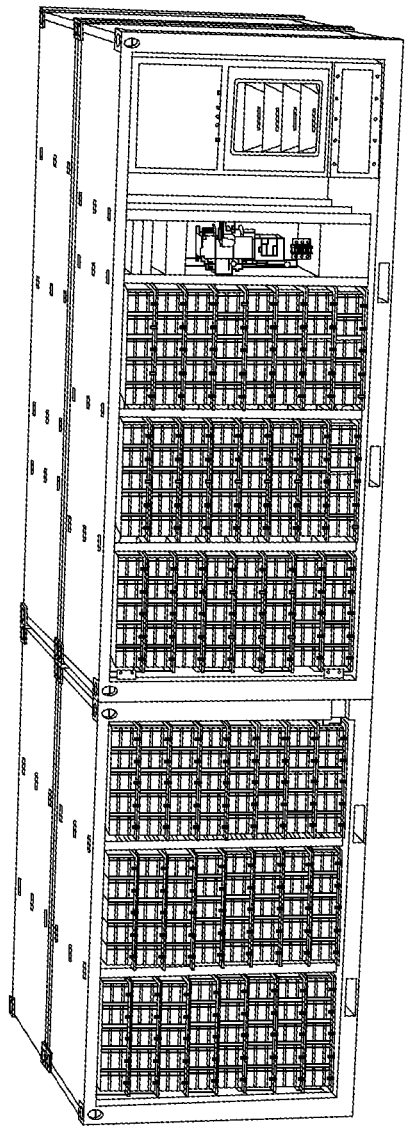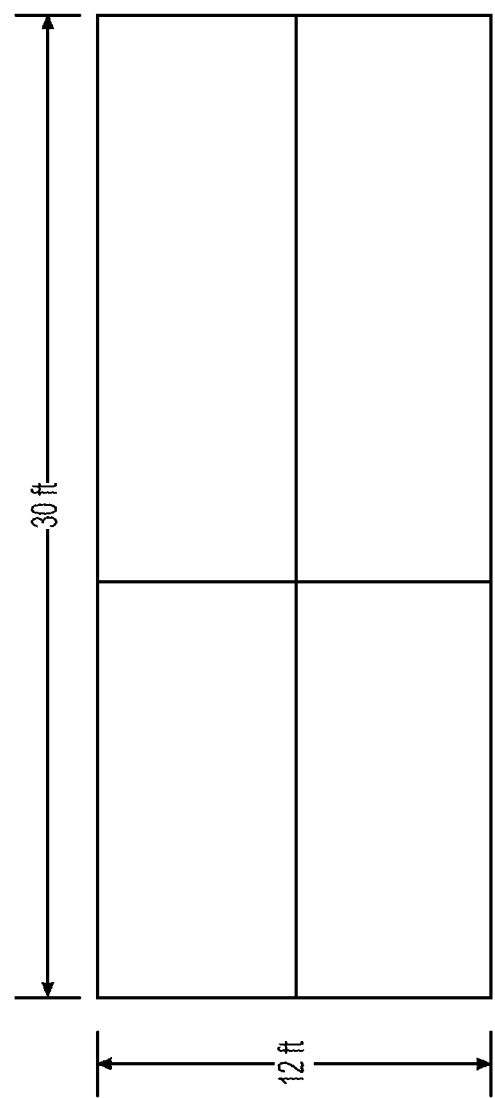
7.1 MWh / 360 sq. ft = 19.7 kWh / ft²
FIG. 27

GRID ENERGY STORAGE SYSTEM FEATURING MASSIVELY PARALLEL-CONNECTED CELLS

PRIORITY CLAIM

This application is the U.S. National Stage of International Application No. PCT/US2022/014092, filed Jan. 27, 2022, which designates the U.S., published in English, and claims the benefit of U.S. Provisional Application No. 63/143,007, filed Jan. 28, 2021. The entire teachings of the above applications are incorporated herein by reference.

TECHNICAL FIELD

Embodiments of the present disclosure relate to grid electrical energy storage systems, improved components thereof, and improved methods of assembly. Specifically, certain embodiments of the present disclosure relate to an improved system architecture for improving the modularity of grid battery electric energy storage systems.

BACKGROUND

Energy (Wh) available from any cell is the product of its capacity (Ah) and its average discharge voltage (V). To achieve desired voltage, power, and energy, cells are connected in parallel and/or series. The capacity of parallel-connected cells is the sum of the connected cells' Ah rating. The voltage of parallel-connected cells is the voltage of the individual cells. The capacity of series-connected cells is the Ah rating of the individual connected cell. The voltage of series-connected cells is the sum of the individual connected cells' voltage. Ignoring efficiency and wiring losses, both parallel- and series-connected cells have an energy content equal to the sum of their connected cells' energies.

Conventional grid battery electrical energy storage systems comprise battery cells, cells connected to form groups, groups of cells connected to form modules, and collections of connected modules to form strings, which in turn comprise battery packs or racks sized for a desired application. Grid energy storage systems rely on scalable modular architecture to achieve the desired levels of voltage, current, and energy for a particular end-use application.

Battery cells are the smallest unit of electrochemical energy storage in a system. Groups of 1-10 cells are connected in parallel. Modules typically comprise 6 to 18 groups connected in series. Strings contain multiple modules, connected in series to build up the desired string voltage. The parallel and series configurations from cell-to-group-to-module-to-string are based on desired levels of voltage, amperage, and energy of the combination of cells in a string. Further, multiple strings are often connected in parallel in grid electrical energy storage systems.

In both parallel and series configurations, connected cells should charge and discharge at the same relative rate with respect to one another, achieving a balanced state of charge among all connected cells. A balanced state of charge will typically exist among series-connected cells, because the current through each cell is substantially the same. Over time, however, mismatched self-discharge rates and charge efficiencies among cells may drift. To mitigate imbalanced state-of-charge (SOC) in series-connected strings of cells, many system designs incorporate electronically controlled cell-balancing mechanisms which, over time, gradually correct for the mismatched SOC among cells.

If the system to which the batteries connect can accept a higher dc voltage, additional cells can be connected in series. This increases the storage system's dc voltage and adds more energy to it. If voltage is constrained, energy can be added without increasing dc voltage by connecting additional cells or strings of cells in parallel.

FIG. 1 is a schematic depiction of fourteen 3.7 V lithium-ion cells connected in series in a conventional configuration. Where each cell has a nominal voltage of 3.7 V, the configuration yields about 1,400 Wh at about 52 V. FIG. 2A (left) depicts cells connected in parallel to each series-connected cell in FIG. 1. FIG. 2B (right) depicts an additional series-connected string of cells connected in parallel with the initial series-connected string depicted in FIG. 1. Where each cell has a nominal voltage of 3.7 V, the configurations depicted in FIG. 2A and FIG. 2B yield about 2,800 Wh. The latter parallel, series-connected strings (FIG. 2B) require additional collateral and ancillary monitoring components relative to the configuration depicted in FIG. 2A, increasing the bill of materials (BOM), initial cost, and complexity.

FIG. 3 depicts the configuration in FIG. 2A (two cells in parallel in each series element) in which one of the parallel connected cells has shorted. Each of the remaining cells continues to experience roughly constant voltage due to the series configuration of the cells. FIG. 4 depicts the configuration in FIG. 2B (two submodules in parallel) in which one of the cells in a parallel-connected module has shorted. When cells are connected in parallel, if one cell shorts internally, the other parallel-connected cells will dump current into the shorted cell, aggravating the failure condition. Each of the remaining parallel-connected cells in the string suffering the fault will experience over-voltage because the voltage across the good string will be imposed on the bad string which now has one fewer cell. The remaining good cells in the bad string experience higher average voltage than the good cells in the good string, as depicted in FIG. 4. To mitigate this danger, system designers typically employ means to disconnect the faulty series-connected string from the good string by a controlled switch, contactor, relay, or transistor. This requires additional control and monitoring electronics.

Persons of ordinary skill appreciate that cells must be protected from abuse, including excess current, over-voltage, internal and external short-circuits, and physical abuse. Certain chemistries also need to be protected from over-charge, over-discharge, and extreme temperatures. Serious damage can result from these conditions. For these reasons, voltage, current, and operating temperatures should be monitored. Most lithium-ion battery systems include integrated monitoring, protection and reporting to mitigate these risks.

To provide monitoring, protection, and reporting, each module comprising series-connected groups of parallel-connected cells is managed by a multi-channel electronic [module] battery management system. The module's battery management system monitors the voltage of each of the series-connected parallel cell groups inside the module. Each string of series-connected modules is typically managed by an electronic [string] battery management system. The string's battery management system monitors the status and data from each of the module battery management systems and may have protection devices that can protect the modules from damage from continued current flow in or out of them.

FIG. 5 depicts two parallel-connected strings of fourteen series-connected cells each, with monitoring and protection circuitry, monitored by a battery management system (BMS). The BMS can measure temperature, current, and module voltage, and control switches that can actively protect the batteries from external electrical abuse. FIG. 5 depicts that the BMS has a communication link to another control system, which can be another module, or upstream control device.

The BMS monitors the condition of its cells and mitigates or prevents damage to them. The BMS observes the relative states of charge (SOC) and attempts to balance the SOC among them. It can do this by dissipating energy from cells with higher SOC or by moving energy from high-SOC cells to low-SOC cells using active-balancing circuitry. Additionally, the BMS can warn of conditions exceeding the cell's recommended limits through external communication to an external controller. The external controller may control current applied to the battery terminals and may be able to bring the cells back into a safe operating state before damage occurs. The BMS can control current entering and leaving the module by one or more series switches, which can be contactors, relays, or solid-state transistors. If an external controller does not mitigate or resolve a potentially harmful condition, the BMS can open these switches to stop current from passing through the cells.

Grid battery systems are typically made up of modular components, combined in parallel, series, or both. If the voltage range of a single module is appropriate for an intended application, additional modules are connected in parallel to yield more energy, without increasing voltage. Alternatively, additional modules can be connected in series to step up the voltage to a required level. The number of modules, whether in parallel or series, or both, can be increased to meet the energy required of the entire system. FIG. 6 depicts three modules of the type depicted in FIG. 5 connected in parallel. Although the detail is not shown in FIG. 6, as was depicted in FIG. 5, each of the three modules has its own BMS. The string of modules also has a master communication device.

Traditionally, master communication device was used to manage multiple BMS devices. It could function as a zone controller, managing multiple strings of cells with their own [module] BMS and [String] BMS devices.

A string of modules, connected, with protection and communication, is typically referred to as a "battery pack." This is the typical configuration of an electric vehicle (EV) battery. In grid applications, a string of modules is physically configured vertically in a cabinet which is commonly referred to as a "battery rack."

When energy storage strings are connected in parallel with no active equalization between them, the balance of current through each of them will be determined by their relative internal impedances. Variations in impedance can result from variations in manufacturing tolerances, age, operating temperature, performance degradation, connection quality, and wire resistance variations. Energy storage strings should contribute power in proportion to their individual capability or their present condition. Because imbalanced rates of power delivery reduce overall useable energy, this imbalance prevents the group of racks from achieving their fully rated power and energy. For example, when one or more lagging racks are contributing less current than others, one or more of the other racks would need to operate above their specified power rating to compensate for the lagging racks. Thus, where power flow among racks is mismatched, both the power and energy ratings of the group of racks are de-rated.

Dc current is difficult to interrupt during short-circuit events. Inductance from wiring and loads can cause current to continue to flow even after interruption, pushing through air gaps as a high voltage spark. Grid-scale strings are particularly challenging because they can contribute tens of thousands of amps each. Parallel-connected racks of grid-scale units can provide hundreds of thousands of amps into a short-circuit.

To address these challenges, some manufacturers insert buffering power converters between each energy storage unit and the dc bus as depicted in FIG. 7. These converters adjust the relative impedance between inputs and outputs so that each individual energy storage unit's power levels can be adjusted to match the needs of that unit or another system-level goal. As depicted in FIG. 7, a dc/dc converter can draw appropriate power from each energy storage unit and control the absolute maximum current, even in a short-circuit condition. Converters also allow new racks to be placed in parallel with older racks. Systems with individual converters on each of the parallel strings can adjust the current from each rack to compensate for mismatched ages and other factors. These benefits are not free. Converters increase initial equipment cost, impose operating efficiency losses, and incur additional operating costs throughout the grid storage system's service life.

Multiple racks are typically connected in parallel, (either directly or through dc/dc as described in Paragraph above, and depicted in FIG. 7), and these collections of racks can be housed in a container, enclosure, or building, to create a complete grid battery system (GBS). As depicted in FIG. 8 and FIG. 9 respectively, one or more GBS can be connected to a grid-scale power conversion system to comprise the essential elements of a Grid Energy Storage System (GESS).

An exemplary state of the art DESS comprises: four cells having a capacity of 73 Ah connected in parallel to form a group; and fourteen groups connected in series to form a module. This module has a configuration known in the industry as "14S4P;" meaning 14 series, 4 parallel. Each module is monitored and balanced by a [module] BMS, which monitors the 14 different series groups, and two or more temperature sensors strategically placed at different locations inside the module. Seventeen of these modules are connected in series to form a string in a single rack. The string is managed by a [string] BMS which communicates with the [module] BMSs to monitor the status of the cells and modules and engage protection devices to keep them working in safe operating conditions. The entire string is a configuration of 4-parallel by 238-series cells. Since each cell has a capacity of 73 Ah, and a nominal voltage of 3.65 V, the total nominal energy of the string is 4×73×3.65×14× 17=250 kWh (approx.).

Twenty-four of these strings are connected in parallel on one dc bus. The bus, therefore, has a total nominal energy of up to 8 MWh. A [bus] BMS monitors the condition of the strings by communicating to the multiple [string] BMS. The [bus] BMS communicates with upstream system controller and coordinates the interaction between the strings for their well-being. The [bus] BMS can aggregate the status of the strings and present relevant information to the upstream controller. It can also control local environmental equipment to maintain temperature, humidity, and other parameters necessary for the health of the strings.

The [bus] BMS can also communicates with and control a 4 MW power conversion system that pushes and pulls dc power onto the dc bus. By doing so, it can directly affect the power flowing through the sum of the strings and can align it with the long-term health and safe operation of the strings.

Multiple GESS can be connected in parallel at a point of interface (POI) with the grid to scale the amount of power and energy needed for a particular installation. If one component in a battery system string fails, the impacted string can be disconnected from the dc bus and thereby the rest of the battery system, allowing the battery system to operate at a slightly lower power and energy capability. If something happens to an entire GESS or its associated PCS, the GESS can be disconnected from the grid, allowing the other parallel-connected GESSs to continue operating. This architecture offers a high level of redundancy and scalability. Yet, it also imposes additional costs on the system. Each of the parallel-connected components requires separate monitoring, protection, wiring, connectors, and disconnection devices.

FIGS. 11A-E are a series of schematic, perspective drawings depicting the configuration of conventional cylindrical and prismatic cells, a sealed prismatic cell, module, and pack of a prior known motive power energy storage system application. FIG. 11A depicts an example of cylindrical cell with a cathode, an anode, and an electrolyte and separator. FIG. 11B depicts an example of a sealed prismatic cell with two current collectors. FIG. 11C depicts an example of a prismatic cell and a cell case. FIG. 11D depicts an example of seven prismatic cells in a module case with a module output. FIG. 11E depicts an electrical vehicle battery pack, comprising multiple modules.

Thus, conventional grid electrical energy storage systems are designed based on a system architecture relying on relatively small-scale modularity at each level of the system. From individual cells to groups of cells, to modules of groups, to strings of modules, to racks of strings of modules, and GBSs, the number of individual components connected in parallel and series is limited, to limit the impact on the overall system of a failure in one cell or one component. While this known design architecture is effective at providing redundancy, it comes at the cost of substantially increased parts count, cost, and complexity, and, as will be explained, reduced capacity utilization at the system level.

Conventional systems were assembled in this manner for multiple reasons. First, designers were concerned that a single cell may fail. This motivated designers to reduce the power and energy of a single string because it would reduce the impact of a single-cell-failure event on a larger system comprising more than one parallel-connected string. If the strings are small enough, a larger system made up of smaller strings could, theoretically, continue to operate when one string is shut-down or otherwise isolated from the larger system. If, for example, a large system comprises only two strings, when one of the strings fails and self-isolates itself from the other, the system has only half of its capacity remaining. If, instead, a large system comprises ten strings, when one string fails and self-isolates from the remaining nine strings, the remaining system retains 90% of its rated capability.

Second, using smaller building blocks enables the designer to make smaller-sized systems. Conventional ESS systems range in size between 1 and 20 MWh. To ensure reliability and resilience in the event of a cell or module failure, designers employ N+1 redundant building blocks, where N exceeds 10, and preferably 100. Current ESS systems, in contrast, are regularly sized in the 100-400 MWh range. Future systems will be over 1 GWh. As ESS systems grow larger, conventional architecture and building block sizes become more problematic.

Third, designers have expressed real and/or perceived safety and reliability concerns having multiple cells connected in parallel. When substantial numbers of cells are connected together, the sum of the individual cell's contribution to a short-circuit condition becomes substantial. And a high short-circuit current may cause collateral damage to the battery system.

Further, when one cell in a parallel-connected group of a substantial number of cells fails due to an internal short, a substantial number of good parallel-connected cells will contribute current to the failed cell. This can potentially cause more damage than if fewer cells had been connected in parallel with the failed cell. In such an event, one failed cell causes the entire cell group to fail by excessive self-discharge. When many cells are connected in parallel with each other, there is a higher probability that one of the cells will fail and, in turn, will cause the entire parallel-connected cell group to fail.

Conventional systems have been arranged in this manner to address these and potentially other problems. Yet, conventional systems suffer a variety of other problems resulting from these design philosophies.

A fundamental weakness of strings with low parallel and high series counts is the high probability that the system will suffer lower system capacity. Cells have variable properties such as variable capacity, variable resistance, variable self-discharge, and variable degradation rates as a direct consequence of unavoidable imperfections or inconsistencies inherent in battery cell production. When cells or parallel groups of cells are connected in series, the performance of the series string reverts to the performance of the least effective cell. The lowest performing cell, or group of cells, determines the overall performance of the entire string due to the nature and safe management of a series-connected system.

By way of a typical example, when hundreds of single cells are connected in series, and the performance of each cell has a probability distribution of +1-2.5%, there will be a high probability that one of these hundreds of cells will have a performance towards the low end of the distribution, namely, −2.5%. Therefore, the string will have a high probability of suffering low performance overall. Therefore, such systems have to be oversized by at least 2.5% in order to assure that their specification meets the requirements.

While the conventional approach of disposing parallel and series groups of cells into a module may reduce the perceived risk and consequences of individual cell failure, it introduces additional failure modes. These conventional approaches require substantial collateral or ancillary monitoring, protection, and communication components. And these collateral or ancillary components each come with their own associated failure rates. Critically, the failure rates of these collateral or ancillary components may be higher than the failure rates of single cells.

Collateral components include, without limitation: sensors; electronic monitoring components; wiring; connectors; cooling systems; and components performing other ancillary functions. These collateral components in a conventional battery system comprise a substantial proportion of the overall bill of materials of the system. Moreover, in addition to the risk of failure of an individual cell, collateral components increase the complexity of the module and impose multiple additional failure modes on the system. The present inventors believe that the risk of a failure through these additional collateral component failure modes can be 1,000 times higher than the failure rate of an individual cell.

Thus, the conventional approach substantially increases the bill of materials of the system. Moreover, it does so by adding multiple layers of complex electronic components, at each stage of modularity. This increases the cost of the system, resulting in both high initial costs and high operating costs. High costs may be attributed to managing large numbers of strings and modules for a given amount of delivered energy. For example, conventional systems include additional sensors and a battery management system for each string of cells and, additionally, for each module. They may also require additional materials and overhead associated with enclosures for physically housing modules, as well as electronics and cooling systems (e.g., fans), for operations.

Conventional battery energy storage systems are typically air-cooled. This can be inefficient and may be ineffective. Depending on environmental conditions, air cooling may not be sufficient to keep the system at a uniform temperature, or within specification.

Certain battery technologies are known to suffer damaging thermal-runaway in which excessive heat, voltage, current and/or physical abuse can cause the cells to quickly ramp up in temperature, emitting flammable, toxic, and/or explosive gas, and flames. Conventional energy storage systems are protected from heat and fire propagation by combination of explosion mitigation features, gas sensing and ventilation, fire and smoke detection, water sprinklers, direct water injection, clean-agent fire-suppression systems, and/or proactive spark ignition. These systems increase the complexity, bill of materials and the overall cost of the system.

Conventional lithium-ion battery energy storage systems are designed with complex gas detection systems, ventilation systems, and explosion mitigation methods to react safely to a thermal runaway event of one or more battery cells. These collateral systems typically rely on additional gas sensors, monitors, and control systems. These add substantial complexity, increase the bill of materials, and increase overall cost of the system. Further, they impose additional costs to maintain, since the critical gas sensors are generally rated for a shorter lifetime than the GESS are expected to operate.

Thus, there is a need for an improved grid battery electrical energy storage system that provides one or more of: greater reliability; reduction in system variability; higher capacity utilization reduction in system complexity; reduction of collateral and ancillary electronics and associated costs; more efficient and effective cooling; less complex and expensive fire-suppression and explosion mitigation; and reduced means of conduction and connection. Embodiments of the improved grid battery electrical energy storage system disclosed herein seek to resolve one or more of these challenges.

SUMMARY

Embodiments of the present disclosure include an improved grid energy storage system, components thereof, and a system architecture therefor, in which cells are connected in parallel to form a group, and groups of cells are connected in series to form modules, and multiple modules are connected in series to form strings. In embodiments of the present disclosure the number of cells connected in parallel to form groups is higher than in conventional systems. Consistent with disclosed embodiments, a module comprises eighteen or more individual cells connected in parallel to form a group, groups of parallel-connected cells connected in series to form strings, which are then connected to a power conversion system to form an energy storage system. One or more energy storage systems can be connected to other energy storage systems via a local ac power grid which can be connected to a wider regional power grid through appropriate interconnection equipment as is known to those skilled in the art of electrical grids.

Advantages of the disclosed embodiments will be set forth in part in the description which follows, and in part will be apparent to persons of ordinary skill from the description or may be learned by practice of the disclosed embodiments. The advantages of the disclosed embodiments may be realized and attained by means of the elements and combinations particularly pointed out in the appended claims.

The foregoing general description and the following detailed description are exemplary only and are not restrictive of the claimed embodiments.

BRIEF DESCRIPTION OF THE DRAWINGS

The accompanying drawings, which are incorporated in and constitute a part of this specification, illustrate several embodiments and, together with the description, explain the disclosed principles. Comparable components are referred to by comparable reference numbers in the drawings.

FIG. 8 is a schematic diagram of a grid battery system of an embodiment of the present disclosure connected to a utility grid.

FIG. 9 is a schematic diagram of an embodiment of the present disclosure depicting multiple parallel—connected grid battery systems connected to a utility grid.

FIG. 10 is a schematic diagram of an embodiment of the present disclosure depicting multiple series—connected grid battery systems connected to a utility grid.

FIGS. 11A-E are a series of schematic perspective drawings depicting the configuration of conventional cylindrical and prismatic cells, a sealed prismatic cell, module, and pack of a prior known motive power energy storage system application.

FIG. 19A is a top plan, schematic view of a block of an embodiment of the present disclosure depicting four strings of modules.

FIG. 19B is oblique view of an embodiment of the present disclosure depicting a collection of strings forming a rack.

FIGS. 21A through 21D are illustrative graphs depicting representative distributions of characteristics of units of a component, for example, cells, under different types of distributions.

FIGS. 22A and 22B are illustrative graphs comparing distributions of populations of probability and distribution, depicting that the initial distribution (FIG. 22A) approaches a normal distribution (FIG. 22B) as the sample size increases.

FIGS. 25A-25D are schematic side views of a gas-actuated contactor of an embodiment of the present disclosure.

FIGS. 26A-26C are schematic representations of conventional grid energy storage systems, depicting the approximate sizes and energy of the systems.

FIG. 27 is a schematic representation of a grid energy storage system of an embodiment of the present disclosure depicting the approximate size and energy of the grid energy storage system.

DETAILED DESCRIPTION

Embodiments of the present disclosure differ from conventional grid battery electrical energy storage systems based on fundamental changes in the architecture of the system. Specifically, modifying the architecture regarding the scale of modularity of a grid energy storage system can provide substantial benefits relative to conventional grid energy storage systems. How components of the systems are designed, assembled, and combined can be improved by employing the system architecture of the present disclosure.

Specifically, rather than avoiding substantial parallel connections at the basic level of modularity, as do conventional approaches, embodiments of the present disclosure employ substantial, and in some embodiments, massively parallel connections between cells at the lowest level of modularity to form parallel-connected groups of cells providing substantial capacity at nominal cell voltage. This improved architecture provides substantial benefits in scaling the system for large-scale grid storage. Embodiments of the present disclosure can provide comparable voltage, capacity, and energy at the module level to that provided by conventional systems at the rack or higher level of modularity, mitigating or resolving many of the problems of conventional systems.

Embodiments of the present disclosure relate to grid energy storage systems, and in particular grid battery energy storage systems. The energy storage systems of embodiments of the present disclosure comprise multiple cells connected in parallel to form groups of cells. The number of individual cells connected in parallel in groups is substantially larger than those of conventional systems, which enables the energy storage system to overcome one of more of the problems affecting conventional systems. By connecting substantially more cells in parallel, the impact of a single cell failure can be reduced, and multiple benefits can be achieved. These include reduced bill of materials, lower initial cost, greater capacity utilization, and improved reliability.

Figure 12:
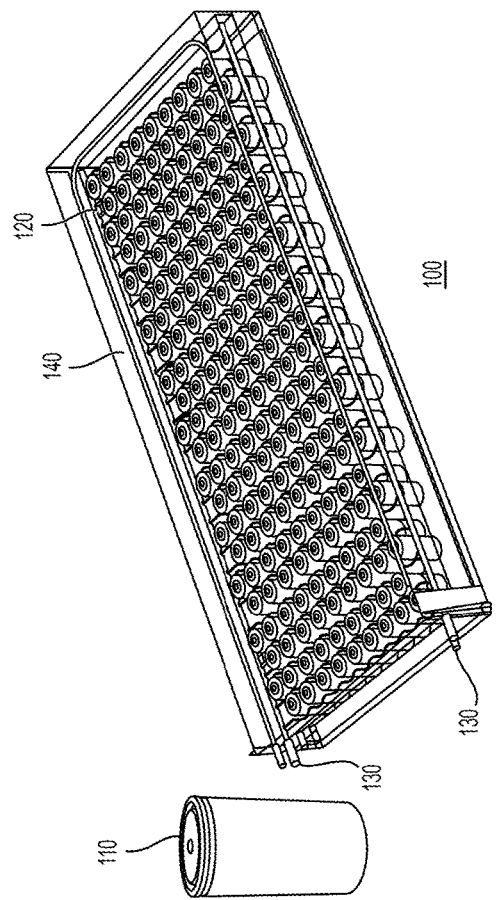
FIG. 12 is a cut-away perspective view of an embodiment of the present disclosure depicting a group of parallel-connected cells comprising a module.

As depicted in FIG. 12, embodiments of the present disclosure implement an architecture of the parallel connection of many individual cells 110 at the lowest modular level 100. The present inventors refer to this lowest level module as a SuperCell 100. Connecting many individual cells 110 in parallel produces a group of cells exhibiting the same nominal voltage as the individual cells 110, with the combined capacity of all cells 110 in the group. Further, the combined capacity of the SuperCell 100 is not limited by the weakest cell, as it would have been had the cells 110 been connected in series.

Figure 1:
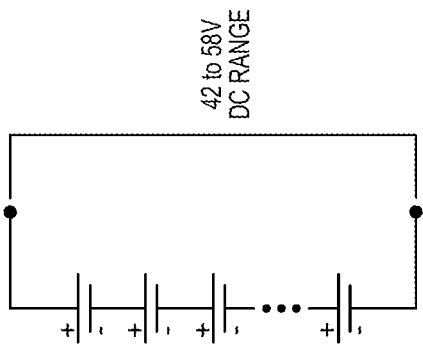
FIG. 1 is a schematic diagram of a conventional architecture, showing a group of fourteen series-connected 3.7 V cells, yielding about 1400 Wh at 52 V.
Figure 2B:
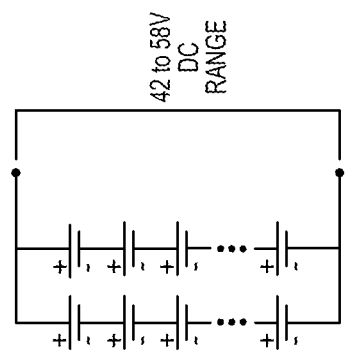
FIG. 2B is a schematic diagram of a conventional architecture, showing a second group of fourteen cells connected in series, connected in parallel with the initial string of fourteen series—connected cells depicted in FIG. 1.
Figure 2A:
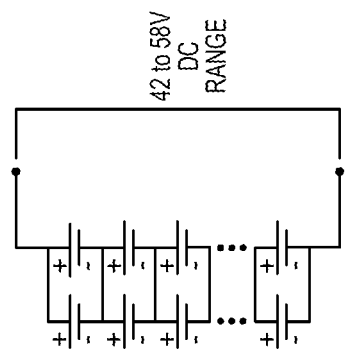
FIG. 2A is a schematic diagram as a conventional architecture, showing cells connected in parallel with each cell of a string of fourteen cells connected in series, as shown in FIG. 1.
Figure 3:
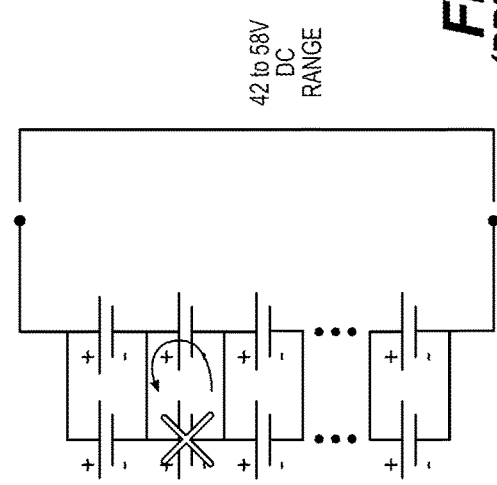
FIG. 3 is a schematic diagram of the conventional architecture depicted in FIG. 2A in which one of the cells has experienced a short.
Figure 4:
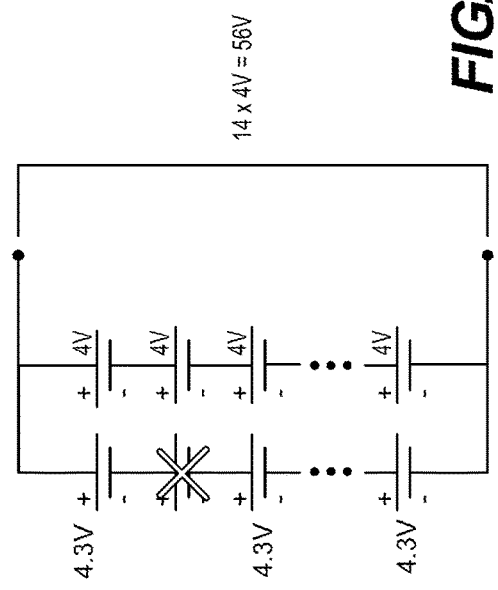
FIG. 4 is a schematic diagram of the conventional architecture depicted in FIG. 3 showing the good string of cells driving overvoltage into the bad string experiencing a short cell.
Figure 5:
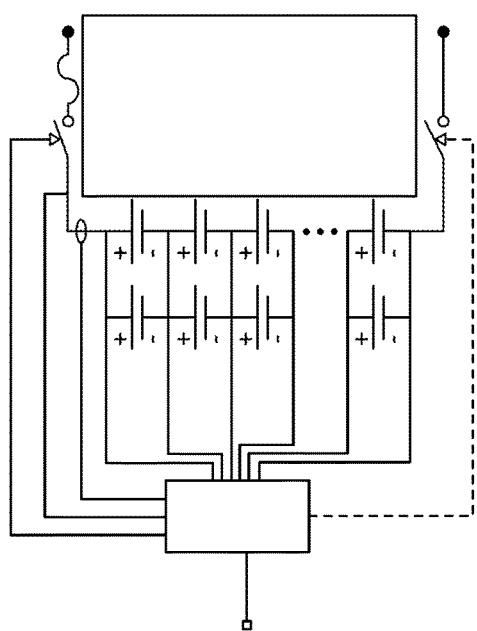
FIG. 5 is a schematic diagram of a conventional architecture depicting fourteen cells connected in series with protection features.
Figure 6:
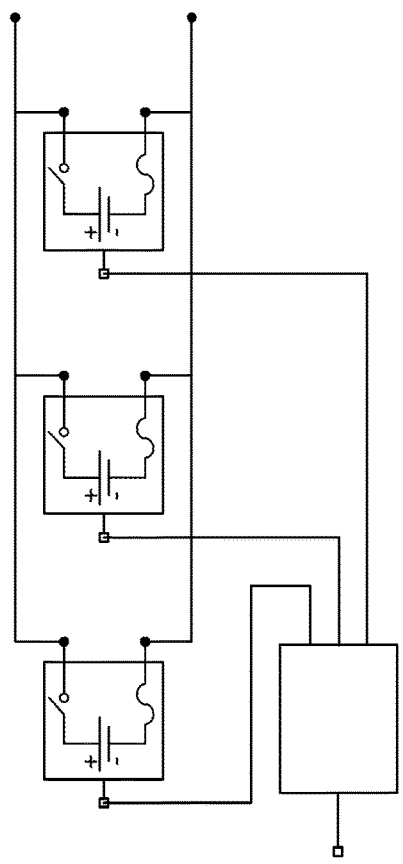
FIG. 6 is a schematic diagram of a conventional architecture depicting a string of parallel-connected modules to yield greater energy.

Connecting substantial numbers of individual cells 110 in parallel, the resulting SuperCell 110 will be physically smaller than the same number of conventional series-connected batteries. The SuperCell 110 architecture requires fewer physical and electrical components than those of conventional architectures. For example, one SuperCell 110 may not require a dedicated BMS 240, but rather, requires a single monitoring channel of BMS 240 disposed at a higher level of modularity. While conventional series-connected cells 110 require a [module] BMS 240 for each module 100, SuperCell 100 electrically looks like a single cell 110 and, therefore, does not have the same demand for collateral or ancillary electronics or battery management requirements. Thus, master communication device 220 depicted in FIG. 6 can be eliminated in embodiments of the present disclosure.

As depicted in FIG. 12, module 100 can further comprise sensor 120, cooling system 130, and module case 140. A modular architecture of an embodiment of the present disclosure, as depicted in FIG. 12, contrasts with conventional architecture in which 1-10 cells 110 are connected in parallel at the lowest level of modularity. Instead, 18 or more individual cells 110 can be connected in parallel to form SuperCell 100. FIG. 12 depicts 198 individual cells 110, having a nominal voltage, for example 3.7 V, connected in parallel to form a SuperCell 100 having a nominal voltage of 3.7 V and capacity of about 5,000 Ah, yielding 18.65 kWh of energy. This SuperCell 110 electrically behaves as a single cell 110, requiring only one channel of voltage monitoring and one channel of temperature monitoring.

Figure 16:
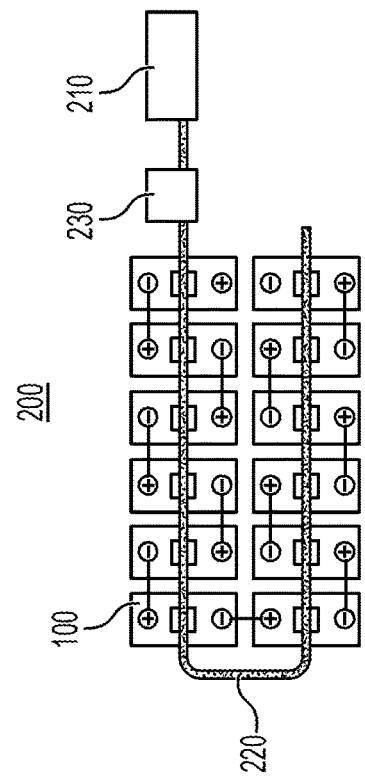
FIG. 16 is a schematic top view depicting an alternative embodiment of the present disclosure comprising 12 modules connected in series to a single Battery Management System.

FIG. 16 depicts an alternative embodiment of the present disclosure comprising string 200 of multiple modules 100, each comprising one or more SuperCells 100, connected in series to form string 200. In this embodiment, 400 individual SuperCell modules 100 are connected in series to form string 200. Twelve SuperCell modules 100 are depicted in FIG. 16. Communication means 220 can connect additional SuperCell modules 100, up to 400 in this embodiment. All 400 SuperCell modules 100 communicate with a single battery management system 210 through interface unit(s) 230. SuperCell modules 100 can communicate with interface unit 230 through a communication means (e.g., a near-field coupled antenna) 220 or other suitable communication means. Interface unit(s) 230 can communicate with [string] BMS 240 through any number of wired communication interfaces such as CAN, RS485, TCP, or any other suitable communications protocol or network.

As further embodied herein, multiple SuperCells 100 can be connected in series. Five SuperCells 100 can be connected in series to form module 100, which provides 18.65 V, at 5,000 Ah, yielding 93 kWh of energy. Further, additional SuperCells 100 can be connected in series to build the voltage to the desired level of the grid energy storage system.

In another embodiment, connecting in series 24 groups of 5 series-connected SuperCell modules 100 yields 1,300 V, 5,000 Ah, and about 6.5 MWh of energy.

Figure 17:
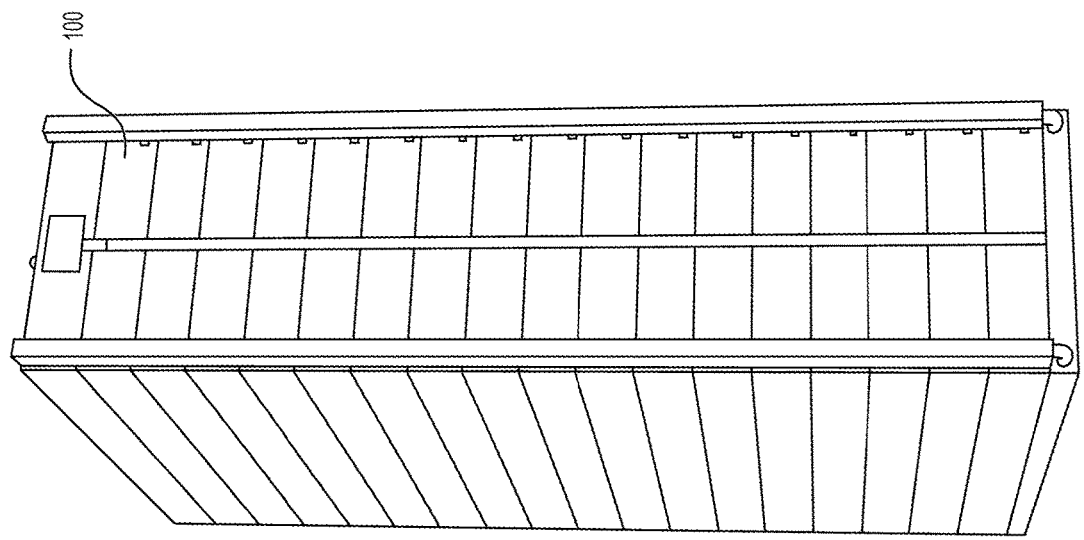
FIG. 17 is a perspective view of an embodiment of the present disclosure depicting a collection of modules forming a string.

FIG. 17 depicts an alternative embodiment of the present disclosure. FIG. 17 depicts 18 modules 100 communicating through near field communication means 220 to IFU 230 and BMS 240. Modules 100 are cooled by coolant provided and removed by cooling channels 130, as were depicted in FIG. 12.

Figure 18A:
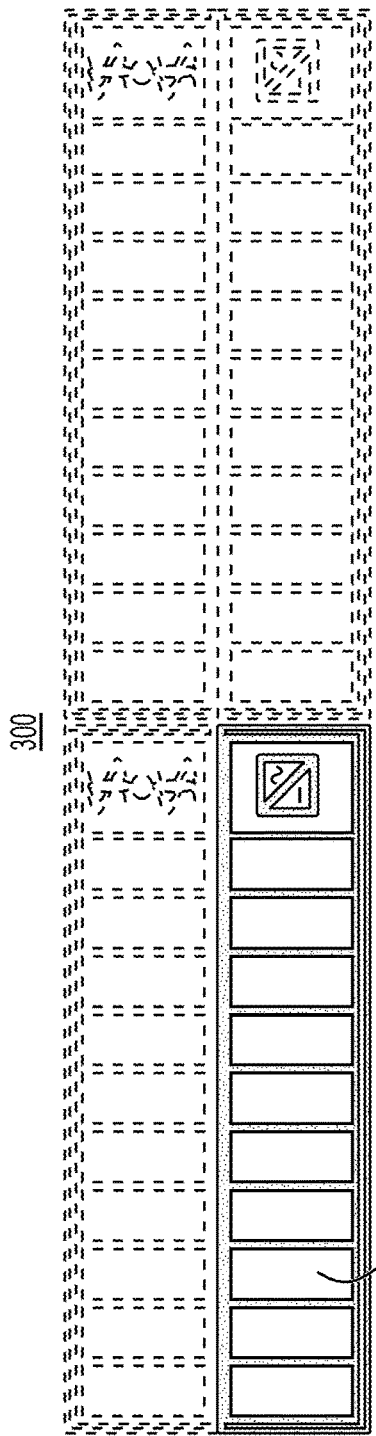
FIG. 18A is a top plan, schematic view of one-quarter block of an embodiment of the present disclosure depicting a collection of modules forming a string.
Figure 18C:
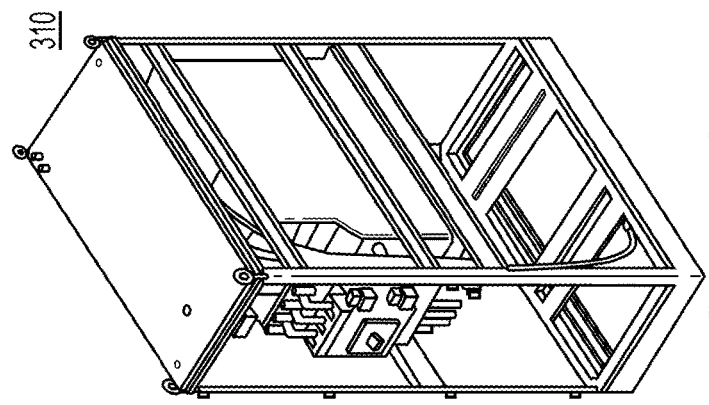
FIG. 18C is an oblique, schematic view of a power conversion system of an embodiment of the present disclosure, configured to fit within the open space at the right-hand side of the quarter-block depicted in FIG. 18B.
Figure 18B:
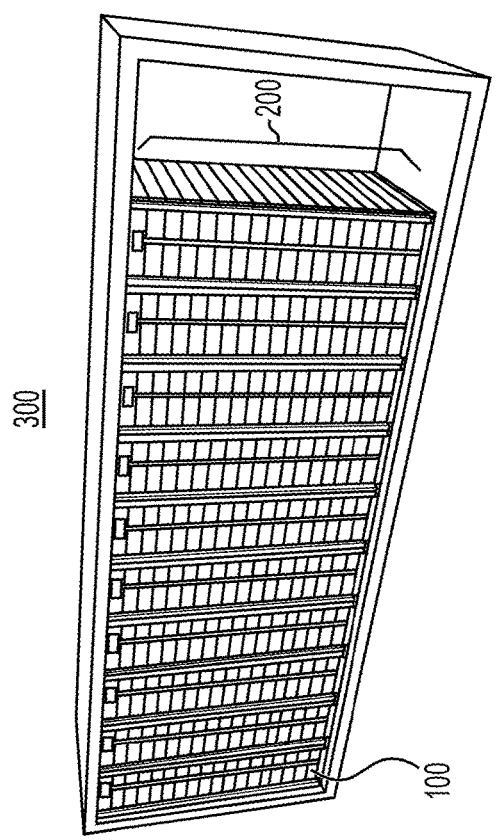
FIG. 18B is an oblique, schematic view of a string of modules comprising a quarter-block of an energy storage system of an embodiment of the present disclosure.

FIGS. 18A and 18B depict 10 strings 200 of modules 100 comprising a quarter-block of energy storage system 300 in top schematic view and oblique schematic view, respectively. FIG. 18C depicts an oblique schematic view of power conversion system 310, adapted to be disposed in the open space in the right side of quarter-block 300, depicted in FIG. 18B.

Figure 18D:
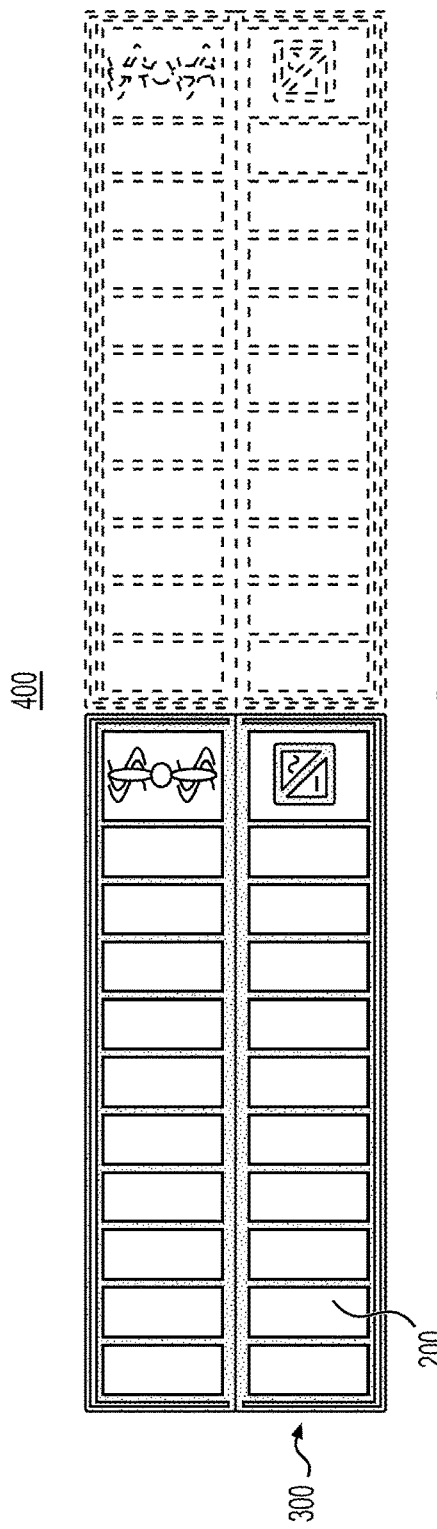
FIG. 18D is a top plan, schematic view of one-half block of an embodiment of the present disclosure depicting two strings of modules.
Figure 18E:
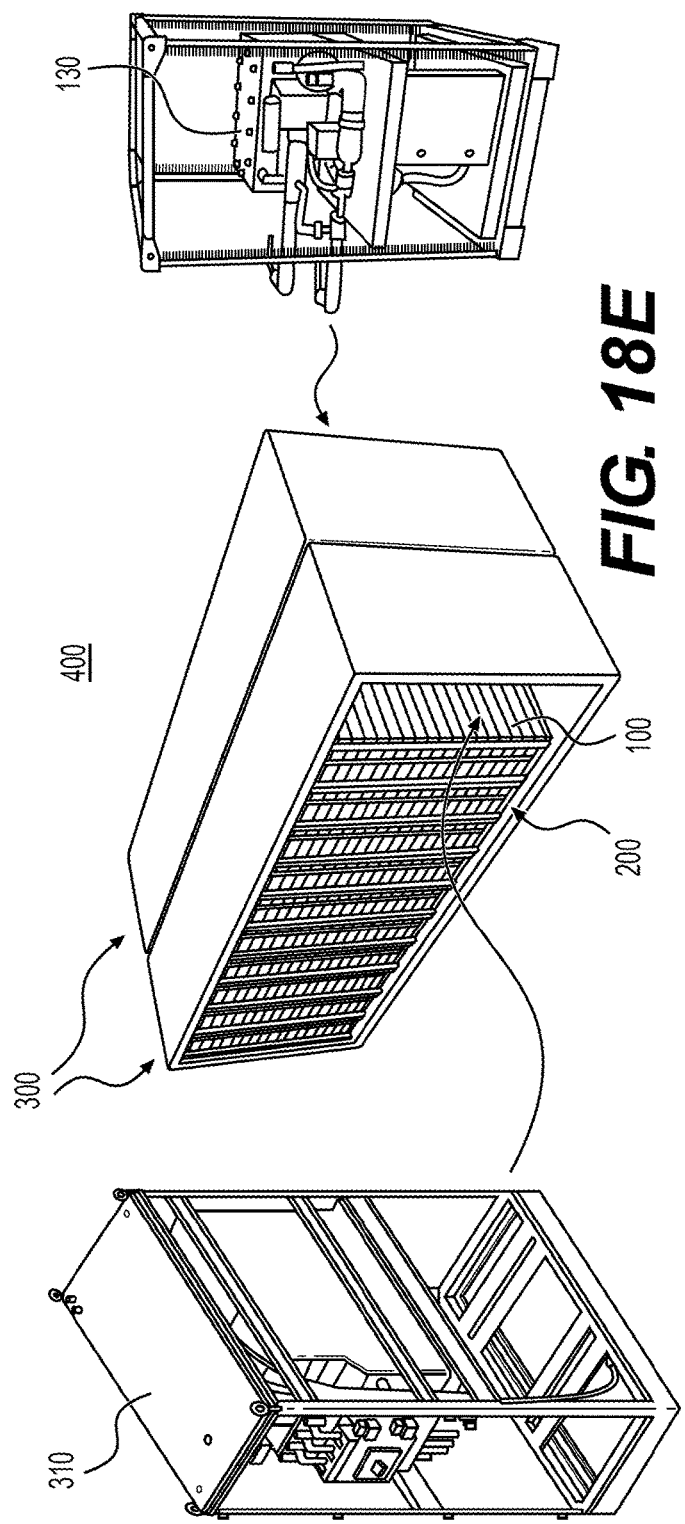
FIG. 18E is an oblique, schematic view of a half-block of an embodiment of the present disclosure depicting a string of modules and power conversion system in one-quarter block of the half-block and an integrated cooling system in the other quarter-block of the half block of an embodiment of the present disclosure.

FIG. 18D is a top plan schematic view of half-block of energy storage system 400. FIG. 18E is an oblique schematic view of an embodiment of the present disclosure. Ten strings of modules 200, as depicted in FIG. 17, are each disposed in quarter-blocks 300 depicted in FIGS. 18A and 18B. Power Conversion System (PCS) 310 is disposed in the open space in one of quarter-blocks 300 and cooling system 130 is disposed in other quarter-block 300 of half-block 400, each comprising one-half of block 500.

FIG. 19A depicts a plain, schematic view of block 500, comprising four quarter-blocks 300 depicted in FIG. 18A and FIG. 18B, and two half-blocks 400 depicted in FIG. 18D and FIG. 18E.

FIG. 19B depicts block 500 and transformer 600. Embodiments of the present disclosure can eliminate the need for a dc bus as well as dc/dc converters connecting each energy storage rack to a dc bus.

Figure 20:
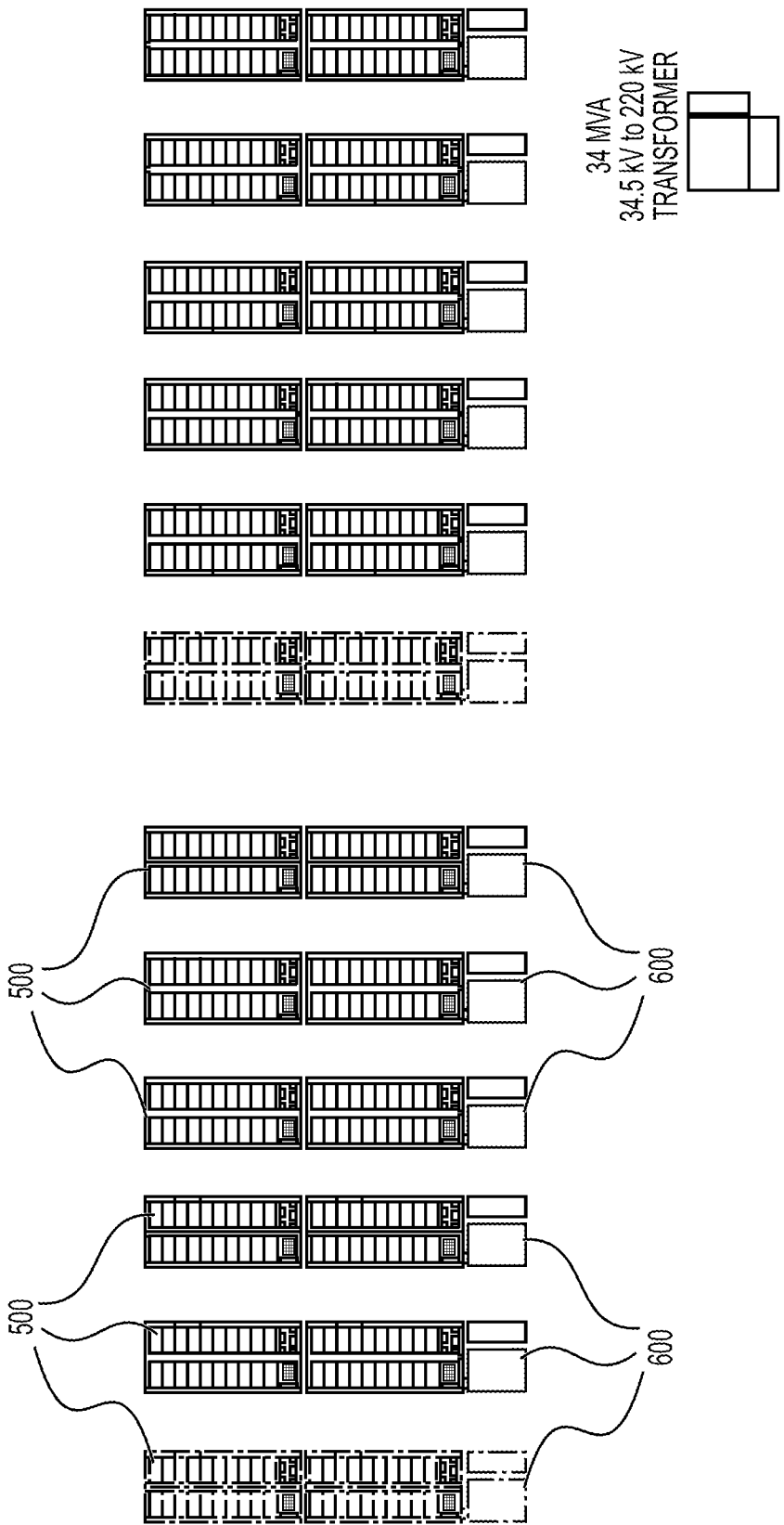
FIG. 20 is a top plan, schematic view of multiple stacks of battery modules, according to an embodiment of the present disclosure.

FIG. 20 is a top plan schematic view of multiple stacks of battery modules, according to an embodiment of the present disclosure. FIG. 20 depicts ten blocks 500 and ten transformers 600.

The present inventors have found that multiple advantages can be secured by employing the novel, massively parallel architecture of the present disclosure relative to conventional system architecture for grid energy storage systems. The present inventors believe that application of the Central Limit Theorem, combined with the Law of Large Numbers, can substantially improve the current state of the art within energy storage by modifying the conventional architecture to employ substantially more parallel connected cells at the lowest level of modularity of the system. Employing this architecture enables systems that are substantially different from conventional systems and resolves one or more of the problems with conventional systems. Neither of these theorems are applied in conventional practice to the architecture of grid energy storage systems.

Different manufacturers making the same individual cell 110 to the same specification may use different raw materials, different manufacturing processes, and varying quality control measures, each of which may contribute to performance variability between individual cells 110. FIGS. 21A-21D, show exemplary variations in cell 110 performance. Even within a single manufacturer's operations, these and other factors may result in substantial variability among the capacity, impedance, cycle life, aging, and other material characteristics of individual cells 110. Further, as cells 110 age and are subjected to usage, individual cells 110 will suffer differing amounts of performance degradation. The overall energy available from conventional systems is negatively affected by the variability of their constituent energy storage components, as described above. Conventional systems overcompensate for the variations by including additional energy storage in the initial installation.

Normalizing the cell performance across all participating storage elements may beneficially increase the operating life of the system and require fewer maintenance visits to maintain guaranteed capacity. Normalizing the distributions and creating a narrow standard deviation may reduce the requirement to oversize the energy storage systems to meet life-time capacity expectations, as described in paragraph

[031]. The Central Limit Theory provides that, as the sample size increases, even atypical samples or non-uniform distributions of units at each modular level can approach or become normal distributions.

The Law of Large Numbers provides that, as the sample size increases, the standard deviation of averages of their summed properties (e.g. average capacity) decreases. Contrary to the conventional approach to grid energy storage system architecture, as more samples or units are included at each modular level of the system, the aggregate of all samples at that level approaches the mean value of the distribution.

Applying the Central Limit Theorem and Law of Large Numbers compounds this effect. For example, at the lowest level of modularity of a typical grid energy storage system, the number of cells 110 connected in parallel is typically limited to 1-10. A larger group of cells 110 connected in parallel can ensure a normal distribution, where one did not conventionally exist with a small number of cells 110. Further, this distribution of the relatively larger number of cells 110 connected in parallel more narrowly approaches the mean of the group of cells 110.

As depicted in FIGS. 22A and 22B, applying the Central Limit Theorem and the Law of Large Numbers, connecting large numbers of cells 110 in parallel reduces the effect of the individual variations between cells 110. Cell manufacture and reliability have improved to the point where the potential for failure of an individual cell 110 is far less than the potential for failure of collateral and ancillary components. Applying these principles, the present disclosure provides a design architecture for a grid electrical energy storage system that resolves one or more of the problems with conventional systems architectures.

FIGS. 22A and 22B illustrate the principal of the Law of Large Numbers. FIG. 22A depicts the variation in parameter "p" among a relatively small number of cells 110. By increasing the sample size above a threshold as depicted in FIG. 22B, the Central Limit Theorem provides that the distribution of average variation tends to a Gaussian distribution. The smaller sample depicted in FIG. 22A shows greater variability than the more Gaussian distribution of the larger sample depicted in FIG. 22B.

Figure 22C:
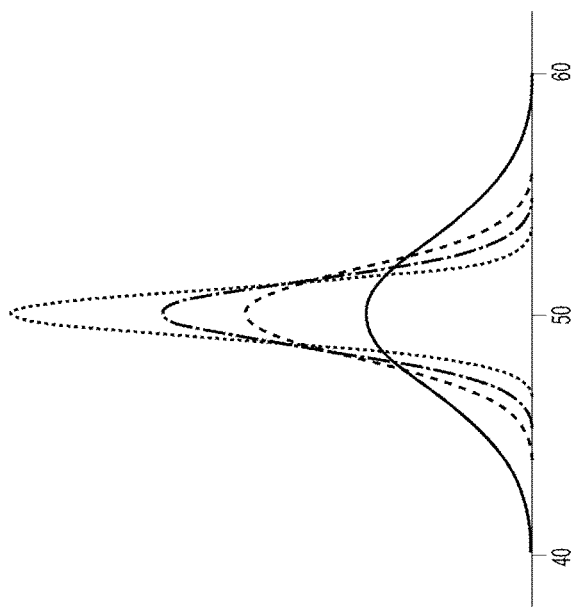
FIG. 22C is an illustrative graph comparing sample sizes and probability distributions for different sample sizes.

As depicted in FIG. 22C, as sample size increases, the probability increases that the sample mean accurately represents the population mean. Groups of relatively large numbers of parallel-connected cells 110 may have almost identical capacity and performance characteristics relative to one another, even if the individual cells 110 are not identical.

Narrowing the differences between series-connected groups of parallel-connected cells 110 can enhance initial performance but also the life of the system. As each cell 110 ages differently, these differences may be compensated by the architecture of embodiments of the present disclosure.

Figure 23:
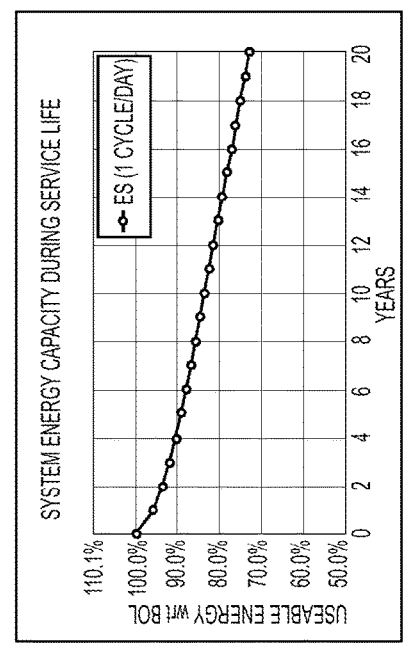
FIG. 23 is a representative hypothetical graph depicting a typical trend in capacity utilization over time of a conventional energy storage system.
Figure 24:
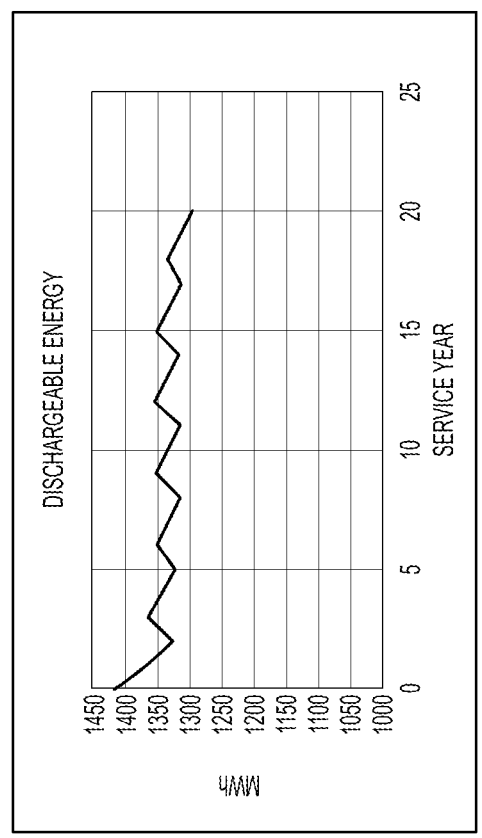
FIG. 24 is a representative hypothetical graph depicting deliverable energy over time, based on periodic enhancement of a grid energy storage system.

FIG. 23 depicts capacity as a function of time over the life of an installation of a grid battery electric energy storage system. FIG. 23 illustrates that capacity decreases as the system ages. As a result, systems can be augmented with excess capacity at initial installation to make up for the fading capacity over time. Alternatively, the capacity of the system can be periodically augmented during its service life. FIG. 24 illustrates capacity resulting from periodic augmentation.

The curves shown in FIGS. 23 and 24 are representative only. Actual curves of all the cells will follow slightly different paths of degradation depending on their initial condition, tolerances in their manufactured processes, conditions during operation and any number of stochastic variables. If a cell 110 with slightly reduced capacity is placed in series with other cells 110 having higher capacity than it, the smaller capacity cell 110 will always experience a wider range of state-of-charge with respect to its own nominal capacity. It is well known in the industry that larger depth of discharge is more harmful to a battery than shallower depth of discharge. Therefore, the cells which have lower capacity in a series string will degrade faster in a cycling usage profile.

When larger numbers of cells 110 are connected in parallel, the resulting group of cells 110 will have a capacity that is the average of all its constituent cells 110. When cycling, the State of Charge (SOC) of all of them will be the same, as is the nature of the cycling of parallel cells 110. Therefore, each cell 110 experiences the same depth of discharge during each cycle. When each group connected in series to other groups have the same capacity, because of the aforementioned Law of Large Numbers, each group will experience the same depth of discharge as the other groups when cycling. When each group experiences the same depth of discharge, and each cell in each group experiences the same depth of discharge, then the rate of degradation of each group with respect to its depth of discharge will be the same.

Other factors will determine cell degradation, such as temperature and physical conditions, and internal stochastic processes and variables. An effective cooling system 130 that maintains a constant temperature across all cells 110 and groups of cells 110 helps maintain consistent capacity degradation among all series connected groups. Variable stochastic processes and variables are mitigated by having many cells 110 in parallel, such that the net effect is averaged.

Having a consistent depth of discharge, operating temperature, and an averaged result of many connected cells 110, results in consistent degradation among series-connected groups. Consistent degradation can result in consistent and more predictable behavior over the system's service life. This can reduce the effort required to maintain the system, leading to a better planned, more economical, and less-frequent maintenance regimen.

Preferred battery cells 110 suitable for use with embodiments of the present disclosure comprise lithium-ion batteries of the subvariant chemistries including, without limitation: lithium-ion iron phosphate (LFP), lithium-ion nickel manganese cobalt (NMC), lithium-ion nickel manganese cobalt aluminum (NMCA), or any other suitable combination of elements suitable for use in a lithium-ion battery to receive, produce, or store electric energy.

The present inventors believe that the number of cells 110 connected in parallel to achieve the benefits of the present disclosure can be 18, and is preferably about 30 or more cells 110. Certain embodiments of the present disclosure may comprise fewer than 30 cells 110 connected in parallel, for example, 18 cells 110. Other embodiments may comprise more than 18, for example, 30 or more, 60 or more, 90 or more, 100 or more, or 200 or more, cells 110 connected in parallel. For example, FIG. 12 depicts 198 cells 110. The precise number of cells is not critical, provided the number of parallel-connected cells is sufficient to obtain the benefits of reducing the variability of one of more of the performance criteria of interest. The appropriate number of cells 110 connected in parallel at the lowest level of modularity depends on multiple factors, including the application, the variability, and the distribution of the parameters of interest between the individual cells 110.

For example, if one cell 110 is made up of constituent components each having a variability unto itself, and the net result of the group of these constituent components is an average of them, then the number of averaged subcomponents per cell, times the number of cells 110 applies to the advantage of this invention. Embodiments of the present invention can comprise any number of cells 110 connected in parallel at the lowest level of modularity of the energy storage system, such that this averaging effect can been achieved. The wider the distribution of performance among cells, the more cells 110 are required to be connected in parallel. The narrower the distribution of performance among the connected cells 110, the fewer cells 110 can be used while still achieving the benefits of the present disclosure. Analysis of the statistical variation and that of the resulting parallel combination may be performed by those skilled in the field of stochastic theory, to determine the optimal number of cells 110 connected in parallel at the lowest level of modularity.

Embodiments of the present disclosure can reduce the variability of a performance criterion of a group of cells relative to the variability of the performance criterion between the individual cells making up the group. The variability can be reduced to a level proportional to one divided by the square root of the number of cells connected in parallel in the group. For example, connecting 18 cells in parallel will result in a performance criterion variability that is 23.6% of the individual cell's performance criterion variability. For example, connecting 30 cells in in parallel will result in a performance criterion variability that is 18.3% of the individual cell's performance criterion variability. Connecting 100 cells in parallel will result in a performance criterion variability that is 10% of the individual cell's performance criterion variability. And, connecting 200 cells in parallel will result in a performance criterion variability that is 7.1% of the individual cell's performance criterion variability. Thus, connecting 18, 30, 100, or 200 cells in parallel reduces the variability of the group to about 25%, 18%, 10%, and 7%, respectively, of the variability between the individual cells in the group.

"Performance criterion," as used in the present disclosure means one of more measurable characteristics of a cell that are subject to variability. For example, embodiments of the present invention may reduce the variability of one or more performance criteria, including without limitation: capacity; impedance; cycle life; and cycle life uniformity, ac resistance, and dc resistance. Further, embodiments of the present disclosure enable the storage system to maintain a minimum distribution of cells' performance as the system ages, resulting in one or more of less frequent augmentation, more uniform system performance, and longer cycle and system life.

Embodiments of the present disclosure can further comprise systems and methods for managing the system, cooling the system, protecting the batteries, and transferring current to and from the batteries.

Managing the system may include monitoring the voltage and temperature of SuperCells 100 and strings 200. For example, as depicted in FIG. 12, sensors 120 that measure the voltage and temperature at their point of presence can be included in SuperCell 100. Sensors 120 can be wireless to communicate voltage and temperature readings to the BMS 240 or intermediary data-aggregating devices through noncontact means, including without limitation near field communication or other wireless technology. Alternatively, sensors can be connected through wired or any other suitable means.

More than one sensor 120 can be deployed to monitor a single SuperCell 100 so that if one sensor 120 fails, another sensor 120 can continue to provide critical monitoring data. More than one wireless channel can be deployed on a single SuperCell 100 so that if one wireless channel fails, the other can continue to provide critical communications to the sensors 120. Sensors 120 may be spatially distributed throughout SuperCell 100 so that when all sensors are functioning, they can monitor more than one physical area of the SuperCell 100, thus, rendering a more complete map of the state of the SuperCell 100 than a single sensor 120 at one location.

Battery Management Systems

Figure 13A:
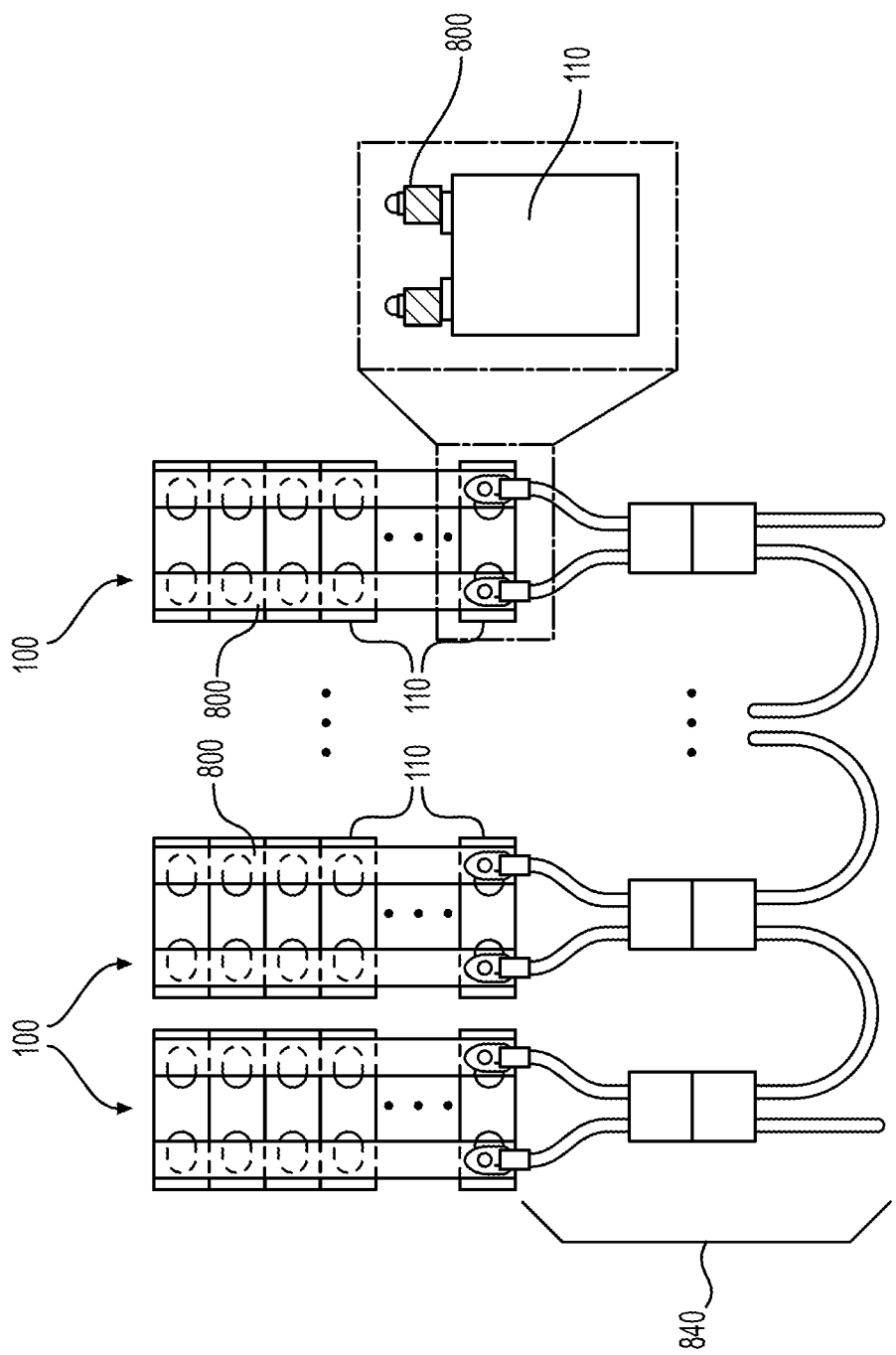
FIG. 13A depicts a plan, schematic view of a conventional module connection design architecture applied to a SuperCell of an embodiment of the present disclosure.

As depicted in FIG. 13A, battery management system (BMS) 240 can monitor, control, protect, and log data of the system of SuperCells 100. BMS 240 can aggregate information from the one or more sensors 120 or intermediary data-aggregating devices to determine the state of SuperCell(s) 100 it manages. BMS 240 can activate current control and cut-off components to protect the SuperCells 100 from damaging electrically-induced conditions. BMS 240 can communicate with power conversion components coupled to SuperCells 100. BMS 240 can communicate to upstream users, managers, or monitors to report conditions related to SuperCell(s) 100 and the system of SuperCells 100. BMS 240 can include communication circuitry, state-machine execution circuits, current control devices, current interrupting devices, and other protection devices to perform the aforementioned functions.

In a lithium-ion battery system, each string of series-connected batteries can be separately managed, sensed, and protected individually, typically by one BMS 240 for each string 200. Embodiments of the present disclosure can comprise one BMS 240 to manage a string 200 of SuperCells 100. In contrast, in conventional architecture comprising more than one string 200 of a much smaller quantity of cells 110 in each parallel group, multiple BMS 240 units are typically required for a given amount of energy storage capacity. Therefore, embodiments of the present disclosure comprise fewer BMS 240 system components than conventional systems for a given energy storage capacity, substantially reducing associated costs.

Automatic Power Disconnector

BMS 240 protects the batteries it manages. BMS 240 can monitor, communicate, coordinate, and ultimately disconnect batteries from the system, if necessary. In embodiments of the present invention, BMS 240 can monitor the conditions of SuperCells 100 through sensors 120. BMS 240 can compare monitored conditions with conditions that could be deleterious to the health of the cells 110. BMS 240 can communicate to power conversion systems 310 to adjust the conditions to benefit the cells' 110 performance. BMS 240 can detect if the cell's 110 conditions are not improving as a result of communication with the power conversion system 310 and independently operate disconnection device 700 that interrupts the current through the battery system. Although this is a drastic step, it is important to be able to take this action in the event other means of controlling the cells' 110 conditions have not been effective. Such a situation could occur if the power conversion system is not operating per expectations or is defunct.

In an embodiment of the present disclosure, a remotely activated contactor 700 can be controlled by BMS 240 to interrupt the current to battery string 200. Many types of actuating mechanisms have been employed to perform the function of interrupting current, including electronic semiconductor devices, electromagnetically activated relays and contactors, motorized contactors, and compressed gas actuated contactors. Embodiments of the present disclosure can comprise any of these mechanisms.

Figure 25C:
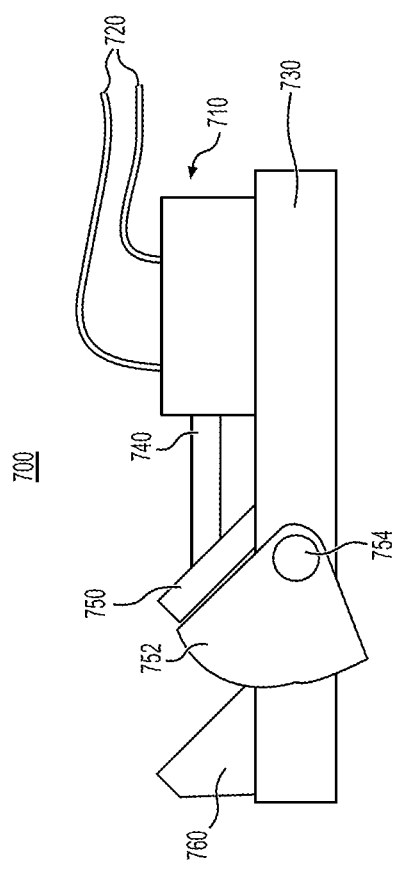

Some embodiments of the present disclosure use compressed nitrogen for other purposes. In some embodiments of the present disclosure compressed gas may be used to actuate components of cooling system 130 or may be used in a fire-suppression system. In certain embodiments of the present disclosure, compressed gas-actuated contactor 700 can be used to rapidly close and open high-power contacts in series with the string of batteries 200. FIGS. 25A-25D depict a gas-actuated contactor 700 of an embodiment of the present disclosure. Contactor 700 comprises cylinder 710 with multiple gas ports 720 and further comprises piston 730 connected to push rod 740. As depicted in FIG. 25A, the other end of push rod 740 is connected to first conductive plate 750 that can contact second conductive plate 760 to complete a circuit. External gas controlling device 770 can direct compressed gas to one or more of the ports 720 in the cylinder to direct piston 730 in one of two directions.

Figure 25D:
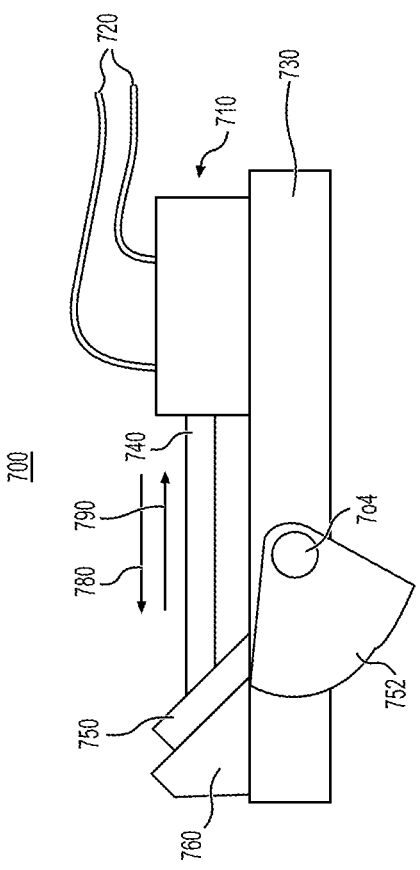

In first direction 780, as depicted in FIG. 25D, push rod 740 can push first conductive plate 750 toward second conductive plate 760, to close the circuit, allowing the batteries to pass current through the battery string 200. In second direction 790, push rod 740 can pull first conductive plate 750 away from second conductive plate 760 to interrupt the current flowing through battery string 200.

In another embodiment, insulating barrier 752 can be disposed between first and second conductive plates 750 and 760 on rotating hinge 754. When first 750 and second 760 conductive plates are separated to interrupt current flow, insulating barrier 752 can rotate into the space between the conductive plates to facilitate breaking the circuit with a shorter distance separating first and second conductive plates 750 and 760. In this embodiment, insulating barrier 752 rotates down and out of the way, when conducting plates 750 and 760 are pushed toward each other.

FIG. 25A depicts contactor 700 in open position. As shown in FIG. 25A, insulating barrier 752 is preferably biased to rotate or move upward, between conductive plates 750 and 760, when first 750 and second 760 conducting plates are separated. As depicted in FIGS. 25B-25D, insulating barrier 752 is pushed and rotates or moves downward, out of the space between conductive plates 750 and 760, when conductive plates 750 and 760 are pushed together. When contactor 700 moves conductive plates 750 and 760 together, first conductive plate 750 pushes insulating barrier 752 out of the way, permitting first conductive plate 750 to contact second conductive plate 760. First and second conductive plates 750 and 760 are preferably oriented at an angle so that first 750 and second 760 conductive plates rub together slightly when they contact one another, helping to clean the contact surfaces each time they make contact.

Improved Busbar Connection

Embodiments of the present disclosure include an improved connection between SuperCells 100. Connecting many cells 110 in parallel, causes current through each group of cells 110 to be larger, in proportion to the number of cells 110 and their rated capacity. Conventional methods for interconnecting modules 100 would typically require means to channel all the current from the cells 110 into one connection point at the exterior of the module 100. Such an architecture would require conductors that are large enough to handle the increased current from multiple parallel-connected cells 110. Consequently, in a substantially-parallel architecture, these conventional module connections would be heavy and expensive. The current channeling conductors in the module would have to ensure that each cell 110 experiences the same current in order not to unduly stress some of the cells 110 relative to others, which could lead to premature wear, heat, and stranded capacity.

Conventional module interconnection means that distribute current to each cell 110 with acceptably lower energy losses, as depicted in FIG. 13A, can cause the module 100 conductors to become prohibitively large when deployed on a massively parallel SuperCell 100 architecture. FIG. 13A depicts a conventional module 100 connection design architecture of the type known in the art applied to a SuperCell-unit architecture of an embodiment of the present disclosure. This conventional module connection design would increase cost, size, and complexity.

Figure 13B:
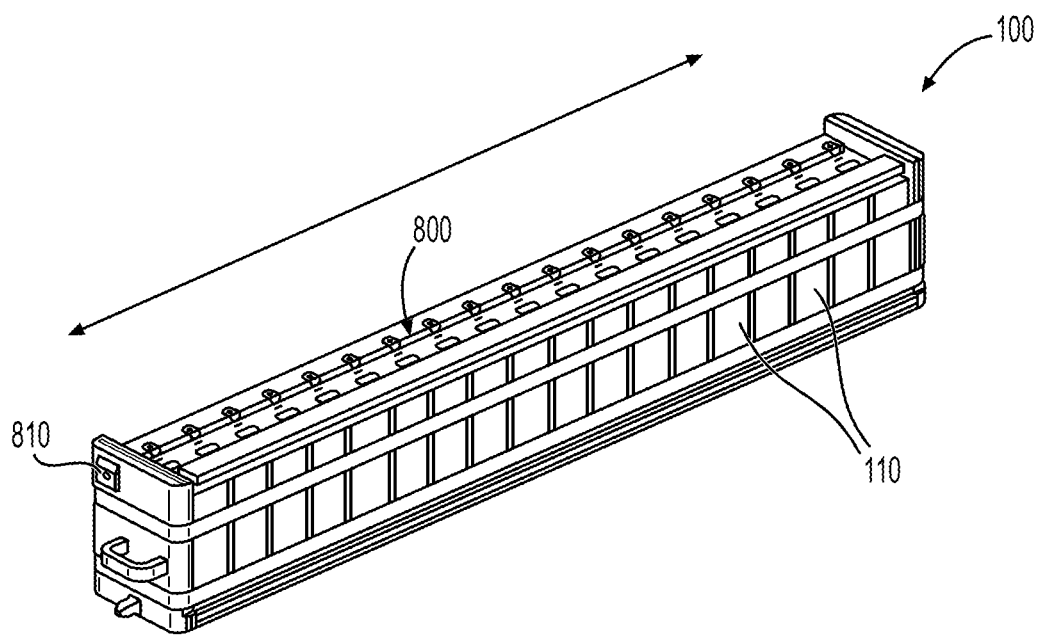
FIGS. 13B and 13C are oblique, schematic views depicting alternative busbars of alternative embodiments of the present disclosure.

FIG. 13B discloses an alternative busbar architecture 800 adapted to connect SuperCell 100 units of an embodiment of the present disclosure. In a system comprising thousands of such SuperCell modules 100, the total weight of busbar material alone could exceed one-ton. Conventional alternatives include heavy cabling 840, as depicted in FIG. 13A, which can involve crimping operations, increased BOM, and increased risk that one of these operations is performed improperly or contributes to component failures.

Figure 13C:
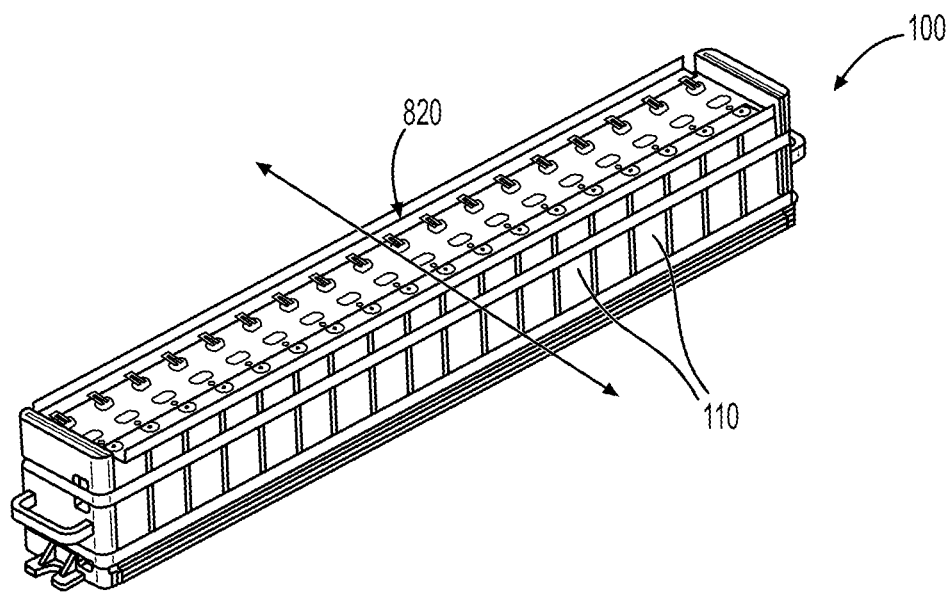

Alternative embodiments of the present disclosure can instead comprise cross-connection busbars 810. Instead of channeling the current to a point at the exterior of the module 810, as depicted in FIG. 13B, cross-current connection 820 scales the busbar on a per-unit-cell basis. The busbar material thickness, architecture, and approach does not change along the length of the module. As depicted in FIG. 13C, cross-connection busbar 820 can be connected along the length of the connected module, eliminating the single-point, concentrated exterior connector 810.

FIG. 13C depicts an exemplary SuperCell 100 with 18 cells 110 connected in parallel. This could be increased to 45 cells 110 connected in parallel without changing the thickness of the cross-connection material because the width of each cell 110, and the expected current flowing out each cell 110, determines cross-sectional area of busbar conductor 820. When another cell 110 is added and connected in parallel, the same conductor material 810 is lengthened, on a "per unit" basis (unit being the width of the cell 110).

Figure 13D:
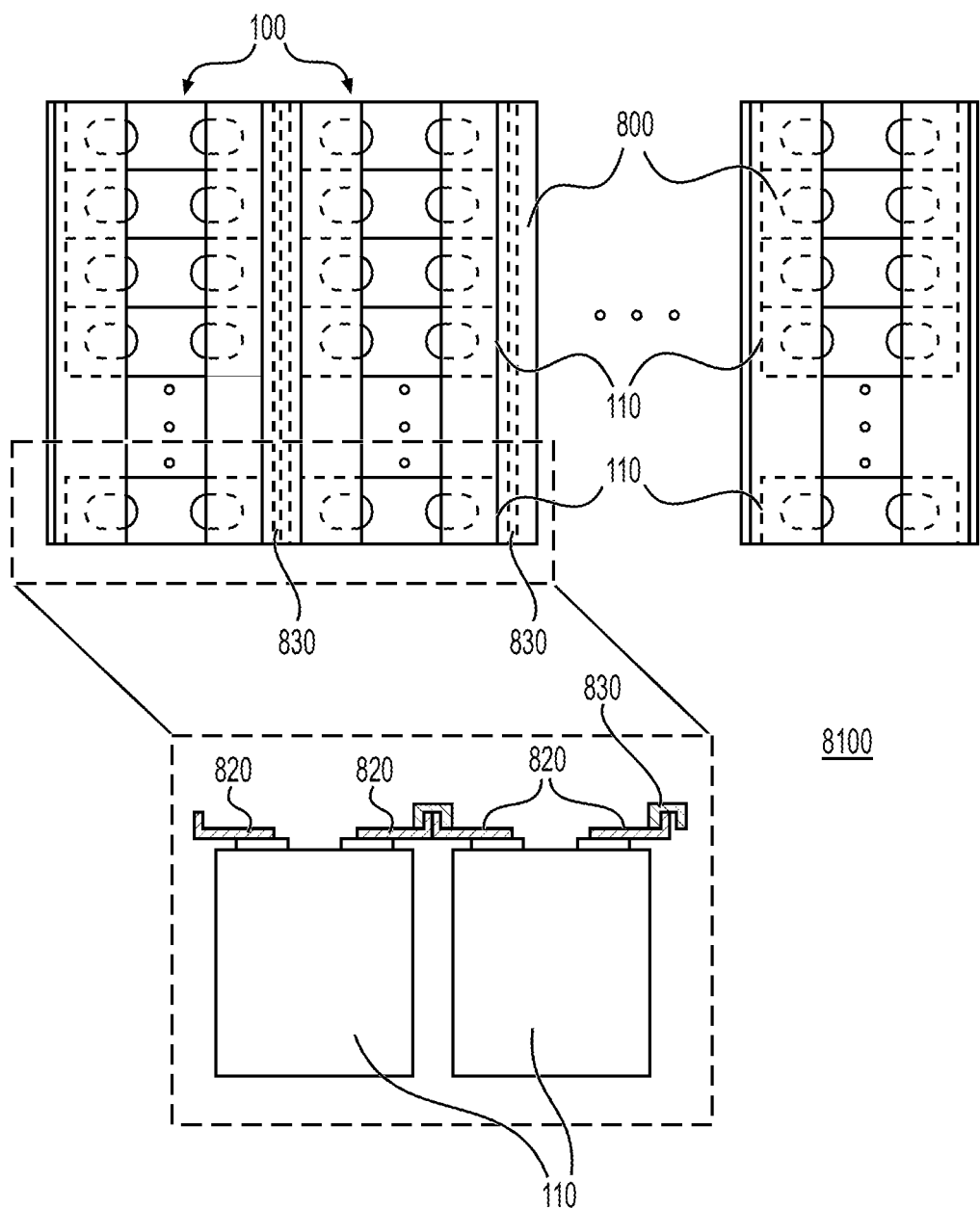
FIG. 13D is a schematic view depicting plan and side views of a busbar connection of an embodiment of the present disclosure.
Figure 14:
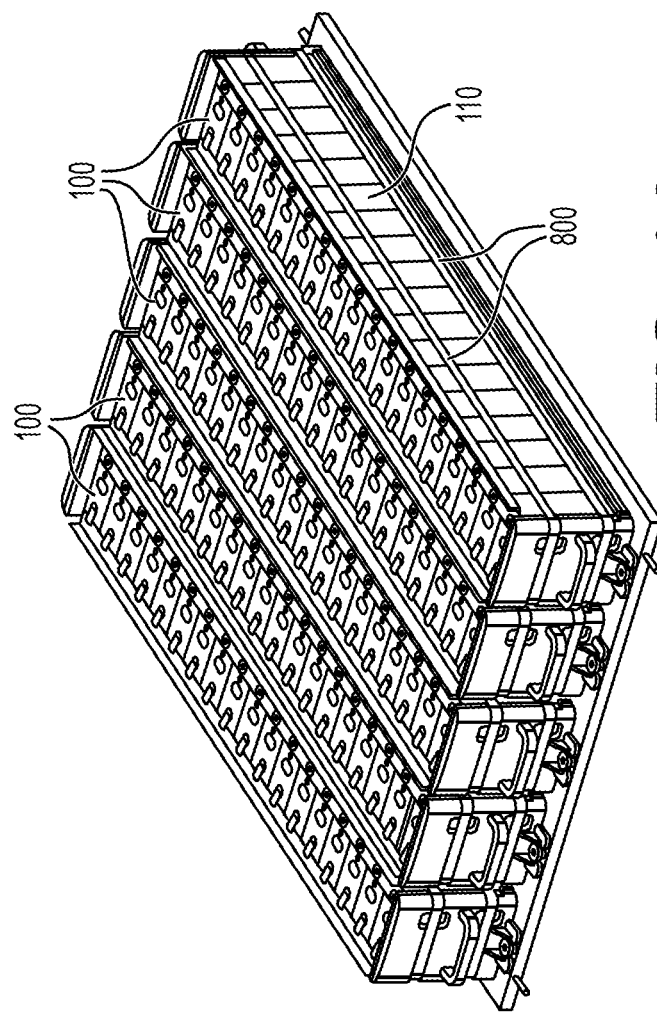
FIG. 14 is an oblique view depicting the positioning of a busbar horizontally connecting adjacent modules of an alternative embodiment of the present disclosure depicted in FIG. 13B.
Figure 15A:
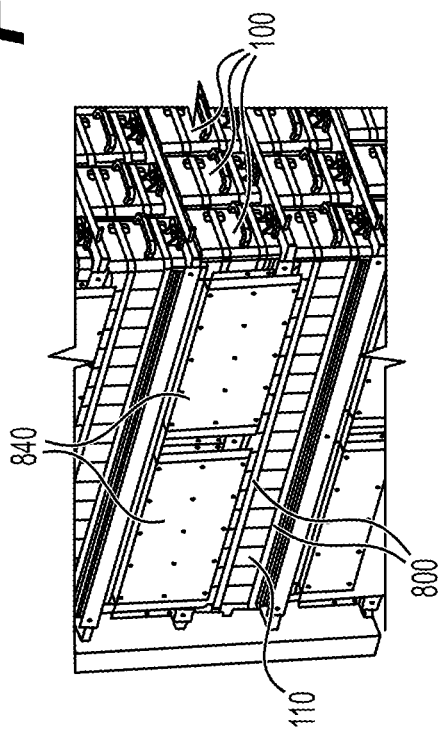
FIG. 15A is an oblique schematic view of a busbar attachment comprising a busbar vertically connecting adjacent vertical layers of horizontally series-connected modules grouped in a sting of an embodiment of the present disclosure.
Figure 15B:
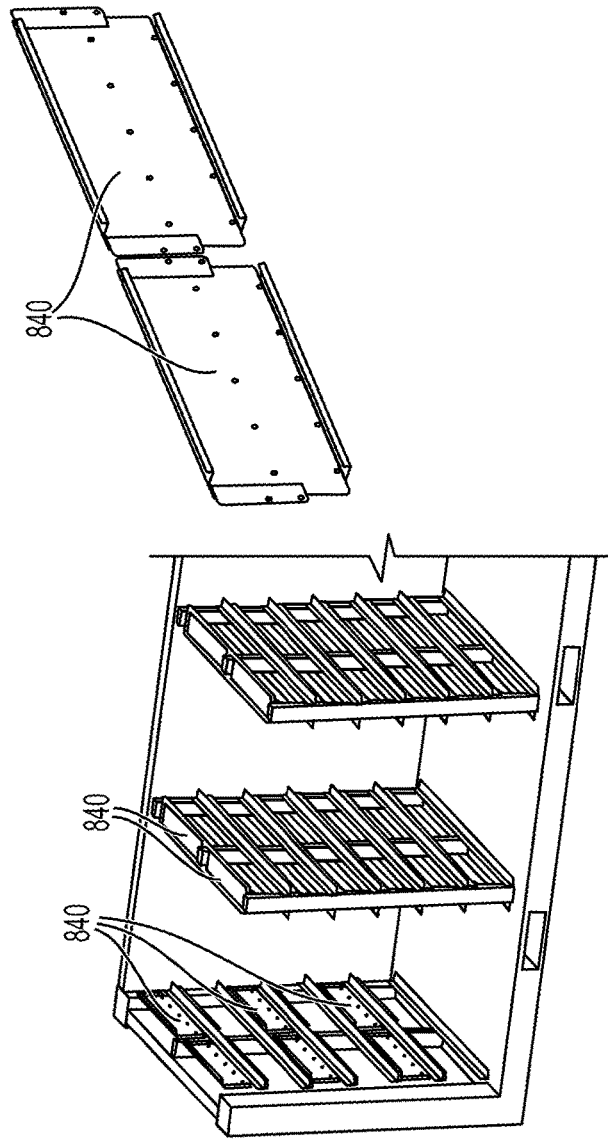
FIG. 15B is an alternative oblique schematic view of the vertical busbar connections depicted in FIG. 15A between vertically adjacent layers of series-connected modules in a string of an embodiment of the present disclosure.

FIG. 13D depicts, in end view, busbar joiner clamp 830 connecting adjacent cross-connection busbars 820. FIG. 14 depicts five SuperCells 100 connected in series along their respective cross-connection busbars 820 in accordance with an embodiment of the present disclosure. FIGS. 15A and 15B depict vertical busbar components 840 connecting adjacent horizontal strings of modules 100 depicted in FIG. 14 through vertical busbar connections 840.

Active Cooling

Embodiments of the present disclosure can be actively cooled. Cooling can be provided by any suitable heat sink mechanism, including without limitation an air-based, water-based, or other liquid-based cooling system 130.

Water-based cooling system 130 can be contained within enclosure 140. Water-based cooling system 130 can decrease water temperature and, more importantly, the temperature difference between cells 110 and SuperCells 100 within a single system.

Figure 28:
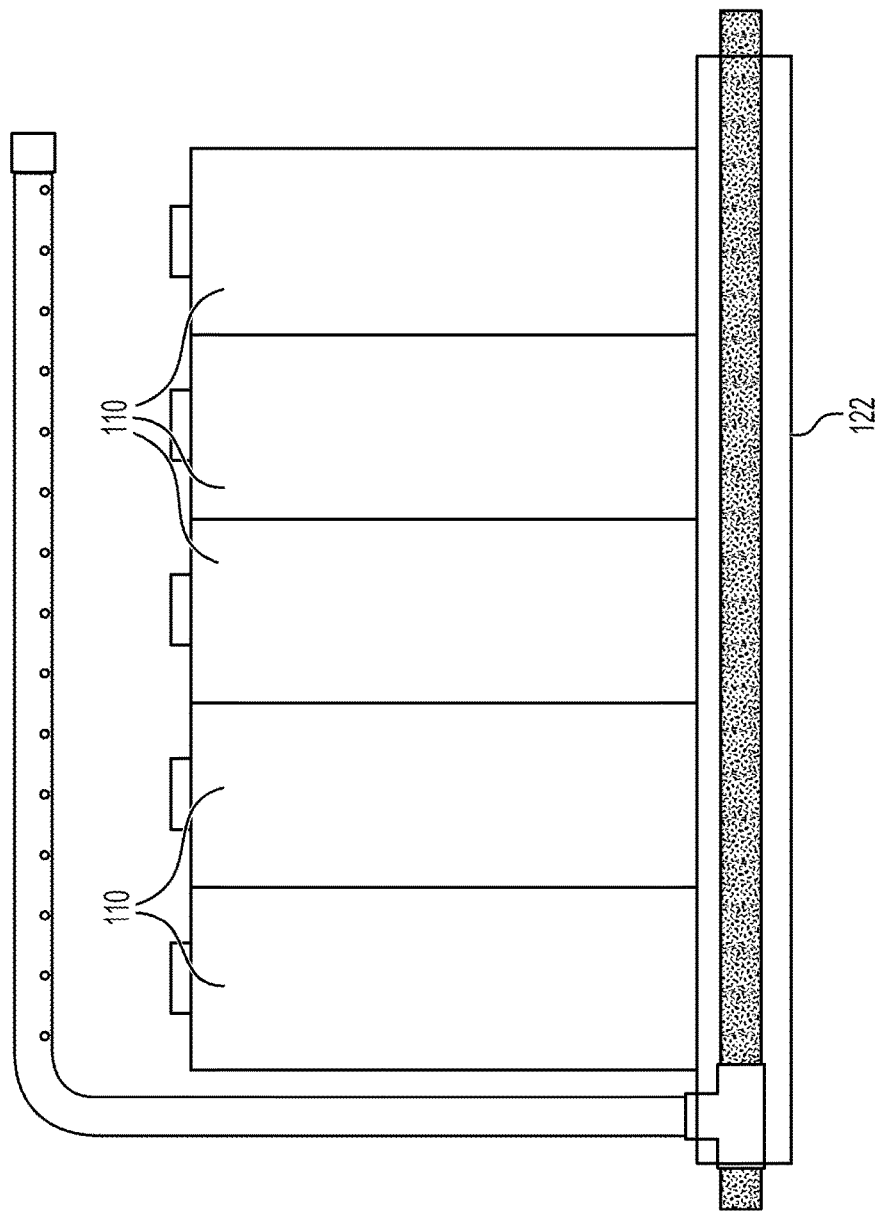
FIG. 28 is an exemplary embodiment of a cooling system with a cooling plate in thermal contact with individual cells.
Figure 29:
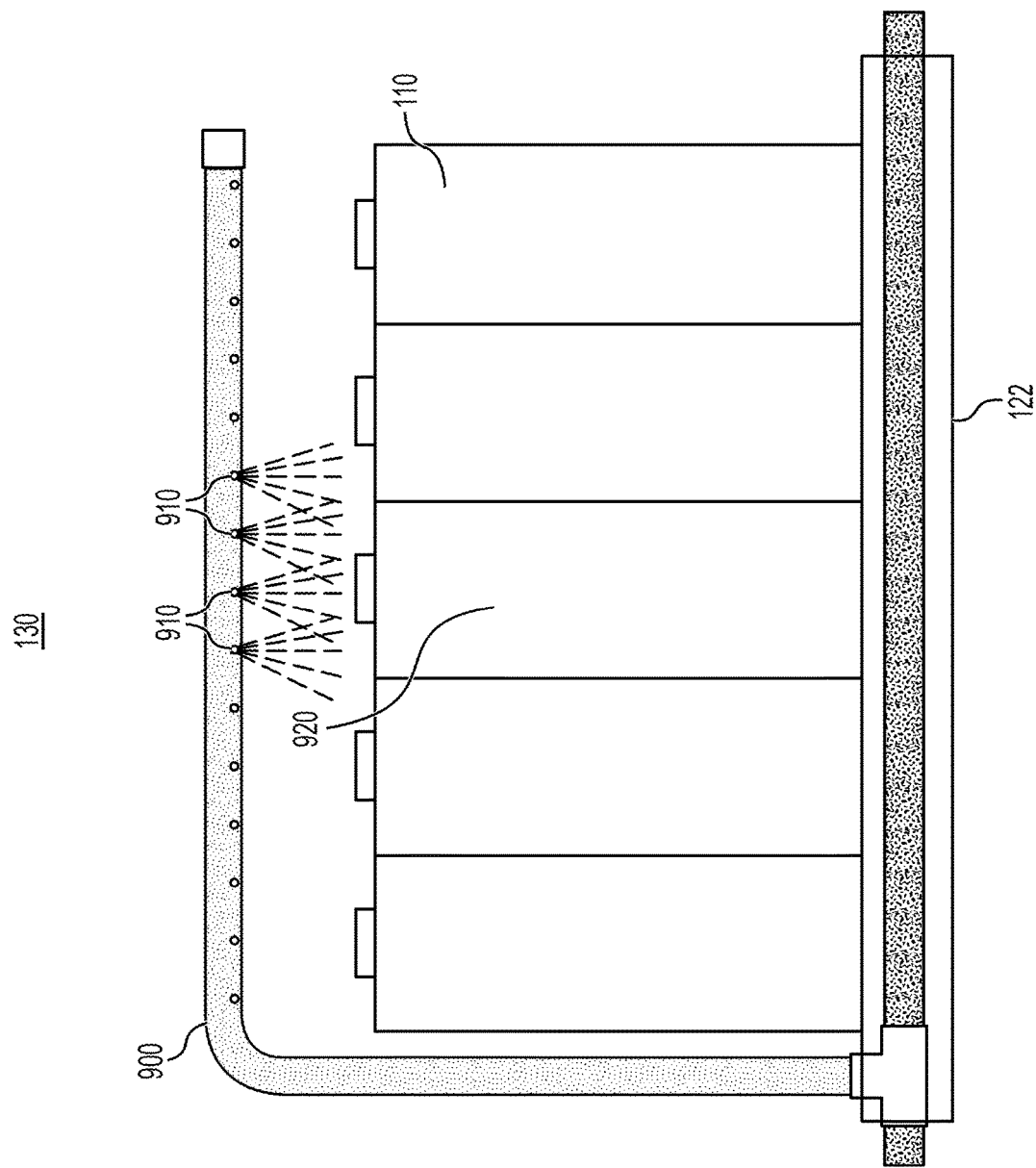
FIG. 29 is an exemplary embodiment of a cooling system releasing coolant at a location of a cell that has begun thermal runaway.

As depicted in FIGS. 28 and 29, in some embodiments, cooling system 130 comprises a cooling plate 122 in thermal contact with individual cells 110. Embodiments of the present disclosure comprise cooling plates 122 made from highly thermally conductive material that transfer heat from the cells 110 to a coolant medium, such as water, and maintain uniform temperature among cells 110. Cooling system 130 embodiments comprise pumps and a liquid distribution system that ensure a uniform temperature among many cooling plates within the system. Cooling plate(s) 130 of these embodiments may also provide physical separation between SuperCells 100, preventing fire and heat transmission from one SuperCell 100 to another.

Reservoir can provide a heat sink, thermal energy storage, that can change the time-of-day that power is used to provide cooling. Times of highest ambient temperature can coincide with times of increased grid-power demand. Thermal storage systems can be used to shift the time during which power is demanded from the grid to a time when electricity prices are lower.

In addition, the time to which the cooling power is shifted, may correspond to when the temperature differential between ambient air and cells 110 is greater, thus increasing cooling efficiency. For example, some environments may experience high daytime ambient temperatures and relatively low nighttime ambient temperatures. A reservoir of water, or other volume of mass with high thermal capacity, can serve as a thermal energy storage medium. The thermal storage medium may be cooled at night when the electricity is cheaper and the cooling process more efficient. During the day, the cooled thermal storage medium can be used to cool the warm cells using a more efficient cooling process than transferring the heat of the cells to a warm day-time environment. This effectively transfers some of the power required to cool the cells to another lower-cost and more effective time-period.

Some embodiments of the present disclosure include a method to prevent the coolant from freezing. In certain configurations, it may be advantageous to use plain water as coolant. In contrast to air, water or another liquid heat transfer medium can provide higher heat transfer properties, enabling the coolant system to maintain the cells being cooled at a level closer to the same temperature. Further, in certain embodiments of the present disclosure, cooling system enables distribution of heat from a cell 110 that is experiencing thermal runaway to distribute that heat over a greater number of cells 110 than only those adjacent cells 110, better distributing the waste heat among a greater number of cells 110 and keeping more of the cells 110 closer to thermal equilibrium.

Control system can detect when conditions establish an opportunity for coolant to freeze, such as loss of power, grid connection, low state of charge, low external temperatures and other predictive indications of such, and pump the coolant into a storage tank. Storage tank can maintain an above-freezing condition using either insulation, electric heating means, or co-generation applications, and can be designed to withstand a freezing condition. When the site regains power and connection from the grid or other, such as a generator, storage tank can thaw itself to allow coolant to be circulated through battery system in regular operation.

A back-up system can be implemented to automatically drain the pipes when the previously mentioned cooling system 130 fails to operate for any reason such as complete loss of power and or control prior to a possible freezing condition. The automatic drain function can be performed by a temperature activated valve that opens under a specified temperature.

Fire Protection

As depicted in FIG. 29, embodiments of the present disclosure comprise a network of tubes 900 routed and made of materials 910 configured to burst at the location of a cell 110 that has begun thermal runaway 920. The breached tubes can apply cooling water directly to cell 110 that has entered into thermal runaway 920, and more importantly, nearby cells 110. When the neighboring cells' 110 temperatures are maintained below their threshold of thermal runaway, the thermal runaway condition of the initiating cell 920 will not propagate to other cells 110 or modules 100 in the system.

Other embodiments of the present disclosure include pressurized tank of inert gas, such as nitrogen, to propel water from storage tank to breach in the water distribution tubing 910. This may be necessary if there is a loss of power to the pumps that would ordinarily supply the pressure to propel water. In this way, fire suppression system has redundant means to propel water in case there is a loss of auxiliary power or satisfactory pump operation. Pressurized nitrogen has a further benefit of providing cool, inert air to the location of the hot cells when the water in the tank has been completely expelled. When any gas expands, as it will when it discharges into the atmosphere, it cools according to the ideal gas law. In addition, nitrogen is a relatively inert gas that reduces the possibility of oxygen fueling a fire.

Power Conversion

Transferring energy to and from the batteries can require converting electrical power. In some embodiments, battery enclosure contains integrated power conversion system 310, which converts battery power to one or more of ac, dc, magnetic, or electromagnetic energy, and of a desired voltage level. Power output in any form can be collected and distributed to power-grids or loads.

Power conversion can also transfer energy between parts of the larger energy storage system to optimize its performance. To maximize the energy available to the output from an energy storage system, it is often advantageous to maintain each subset of energy storage at the same state of charge (SOC). Power conversion can be used to maintain this balance, either periodically or dynamically throughout a discharge. Power conversion can be used to control the rate of discharge of subsets of the energy storage so that they discharge with the same rate of change of SOC. Some prior known systems incorporate dc/dc power conversion to control the power between a common dc bus and a connected energy storage string. This can help to compensate for the mismatch of performance, voltage, and internal impedance between parallel strings that can lead to different rates of change of SOC without equalization power conversion.

Figure 7:
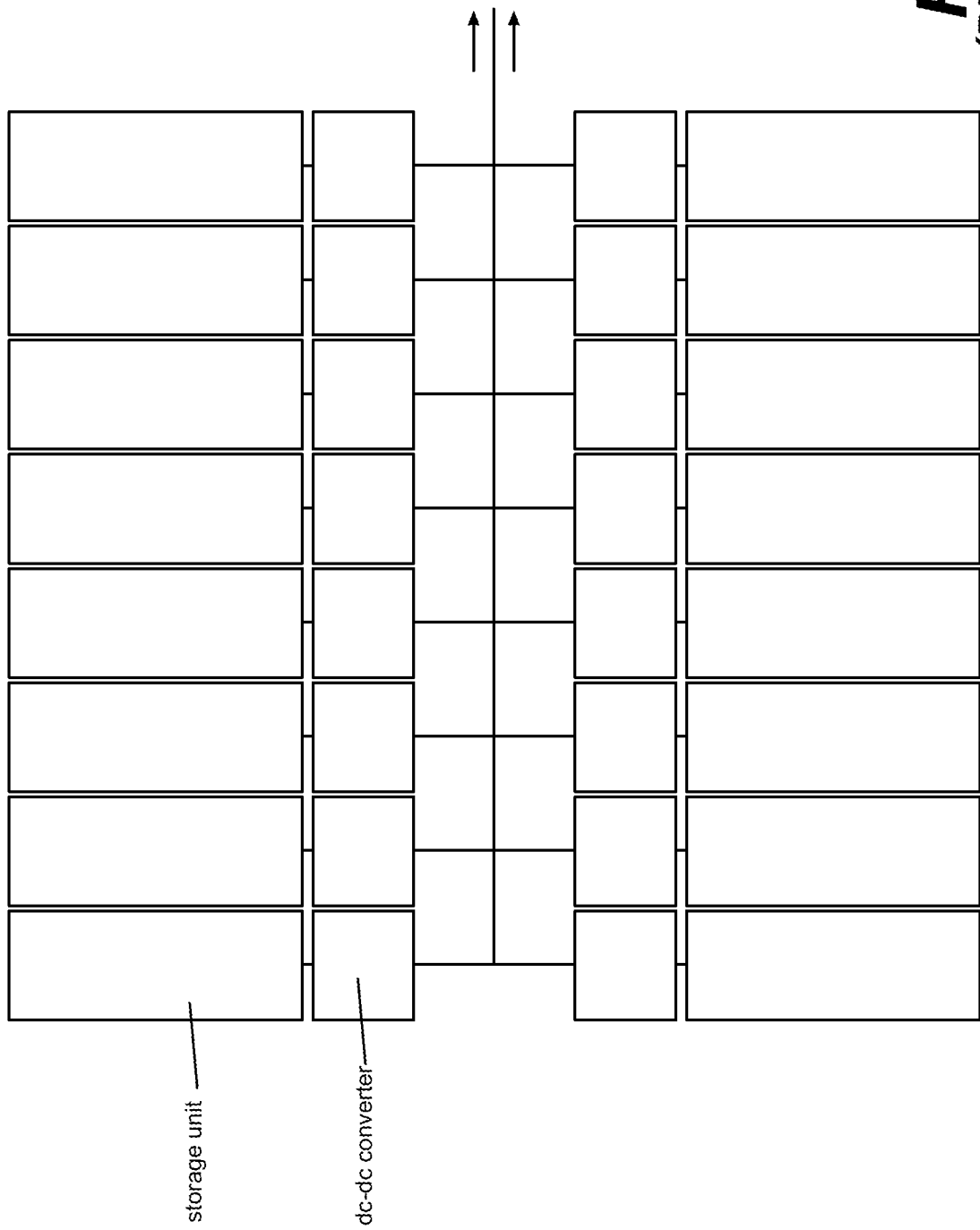
FIG. 7 is a schematic diagram of a conventional architecture depicting an energy storage system with controlled power conversion between each energy storage unit and a common dc-bus connection.
Figure 11E:
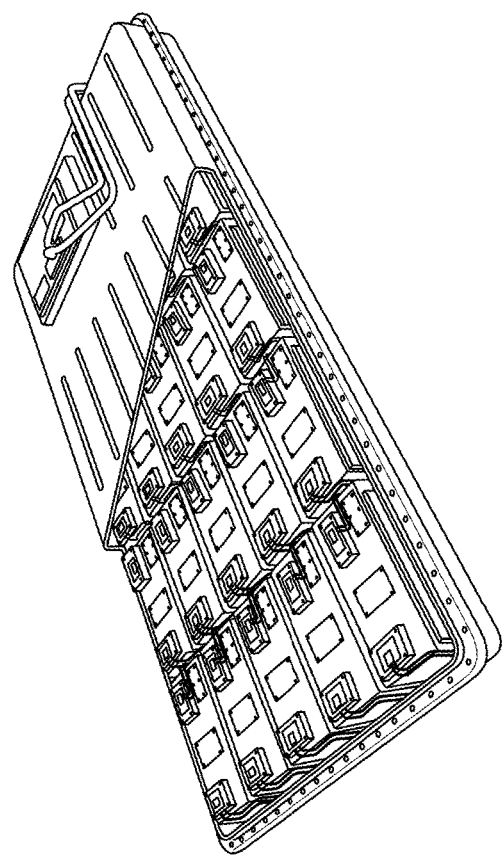

Conventional systems would have many smaller capacity strings connected in parallel to a common bus. To employ power conversion to balance the rate of change of SOC among all parallel strings, multiple dc/dc converters 702 would have to be employed in the battery enclosure, as depicted in FIG. 7. When the multiple strings of a conventional system are replaced by a single string of the present disclosure, size and complexity reductions can be realized. In certain embodiments of the present invention, this final dc bus 704, depicted in FIG. 7, can be eliminated, reducing the bill of materials, cost, and complexity of the overall system.

FIG. 8 is a schematic diagram of a grid battery system of an embodiment of the present disclosure connected to a utility grid. For example, FIG. 8 depicts a grid battery system connected to a power conversion system 310 and a transformer 600. FIG. 9 is a schematic diagram of an embodiment of the present disclosure depicting multiple parallel—connected grid battery systems connected to a utility grid. For example, FIG. 9 depicts multiple parallel—connected grid battery systems to a power conversion system 310 and a transformer 600. FIG. 10 is a schematic diagram of an embodiment of the present disclosure depicting multiple series—connected grid battery systems connected to a utility grid. For example, FIG. 10 depicts multiple series—connected grid battery systems to a power conversion system 310 and a transformer 600.

Figure 26C:
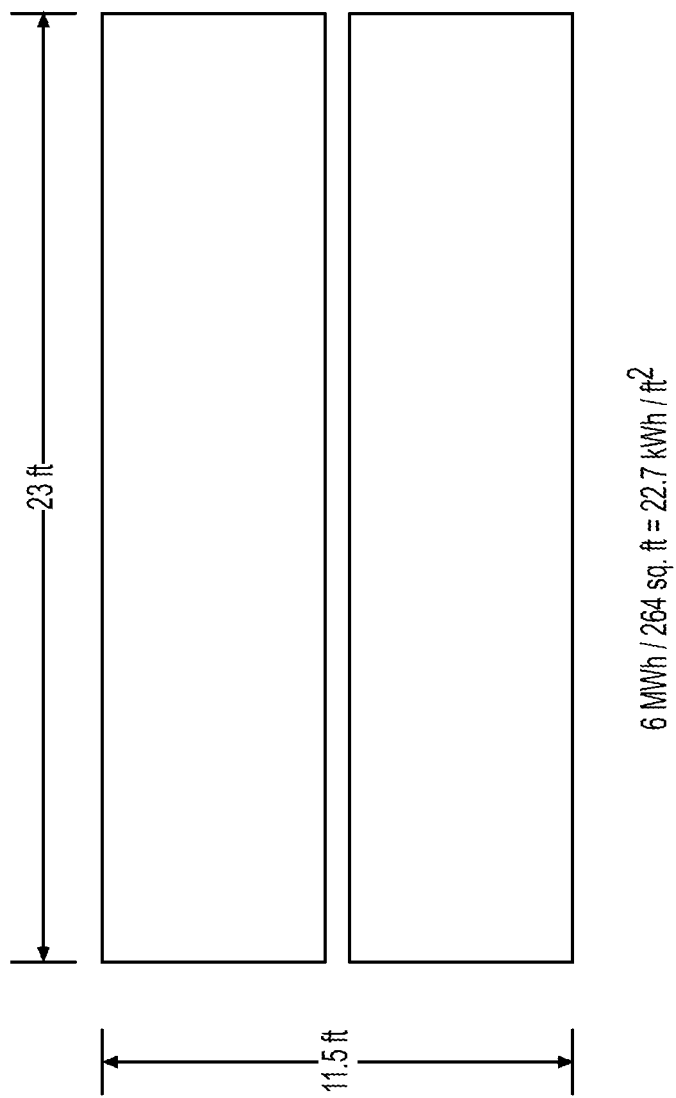

FIGS. 26A-26C are schematic layout diagrams of grid energy storage systems. FIG. 26A depicts a conventional center-aisle system 2700. FIG. 26B depicts another conventional center-aisle system 2702. FIG. 26C depicts an exemplary energy storage system of a type known prior to the present invention.

Auxiliary Power

Power is required to operate one or more controls systems associated with battery storage system. Power is required to operate cooling pumps and fans required to regulate the temperature of the cells 110 at their optimum temperature. Power is required to operate power conversion system between the batteries and the external grid or load. Power is required to operate motorized protection gear, sensors, and actuators throughout storage system. Typically, in a conventional battery storage system, power to operate the auxiliary systems is derived from an external source or powered by the grid itself. This requires auxiliary power transformers, distribution panels, external wiring, and associated field wiring work by licensed electricians.

The present disclosure seeks to reduce or eliminate the need for these additional, associated costs by powering auxiliary operations with an integrated power conversion system that takes dc power from batteries and powers them directly with the required type of power. Fully integrated battery storage system can contain a dc to ac power system which creates a standard ac voltage that can be safely distributed to the internal systems that need it. Conversion system, wiring and connections will be fully certified according to international safety standards and will be factory tested prior to installation. This reduces or eliminates field labor and equipment installation at site.

A portion of the auxiliary power is used to remove heat from battery enclosure that is added to it by the radiance of the sun. In warmer climates, this can amount to an average of 1,500 Watts of average heating for an enclosure comprising 300 square feet of space. At typical air-conditioning efficiency, this can require up to 12 kWh of energy per day, for a single enclosure. Power used to remove this heat and for other auxiliary systems reduces the total efficiency of the battery system, making it less economical to operate.

Embodiments of the current disclosure remove most of the added heat from the sun and add energy to the system to help offset the total power used by auxiliary systems. In some embodiments, solar panels can be arrayed on top and/or side surfaces of battery enclosure to shade the enclosure from the sun's radiance and reduce solar heat gain. Solar panels can also be configured to convert the sun's radiance to electricity, which can then be used to power auxiliary systems. Solar panels can be situated so that they are angled toward the sun, but also are between the sun and the roof of the battery enclosure upon which they are mounted. Additional power conversion equipment can be connected to the PV arrays and to the auxiliary power system. If excess PV power is available for the then-current auxiliary power draw, power can be diverted to the energy storage system to store it for a time when the PV power is not available.

The descriptions of the various embodiments of the present disclosure have been presented for purposes of illustration and are not intended to be exhaustive or limiting. Multiple modifications and variations of the disclosed embodiments will be apparent to those of ordinary skill in the art, without departing from the scope and spirit of the described embodiments. The terminology (such as those referring to groups or arrangements of cells) used herein was chosen to best explain the principles of the embodiments, the practical application or technical improvement over technologies found in the marketplace, or to enable others of ordinary skill in the art to understand the embodiments disclosed herein and are not intended to be limiting or exclude alternative nomenclature.

Certain features of the present disclosure, which are, for clarity, described in the context of separate embodiments, may also be combined in a single embodiment. Conversely, various features of the invention, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An improved system architecture for a grid battery energy storage system, comprising:
   a first level of modularity in which multiple cells are connected in parallel to form a first group of cells;
   a number N of parallel-connected cells in the first group of cells is sufficient to reduce a variability of a performance characteristic of the first group of cells to less than or equal to $[1/\sqrt{N}]$ % of a variability of the performance characteristic between individual cells in the first group of cells;
   the performance characteristic is one characteristic criterion-selected from a group of characteristics, including: capacity, impedance, cycle life, cycle life uniformity, ac resistance, and dc-resistance;
   a cross-connection busbar configured to connect the number N of cells in the first group of cells;
   a second level of modularity in which two or more first groups of cells are connected in series, using one or more cross-connection busbar, to form a string of first groups of cells;
   a cooling system that comprises (i) a cooling plate in thermal contact with individual cells and (ii) a pump and a liquid distribution system to ensure uniform temperature among cooling plates within the cooling system; and
   the grid battery energy storage system is adapted to be connected to supply or store electrical energy.

2. The system architecture of claim 1, further comprising cross-connection busbars that can be scaled to connect any number of the N cells in the parallel-connected first groups of cells.

3. The system architecture of claim 2, wherein a weight of the cross-connection busbar is less than that of a busbar material which would have otherwise been needed to carry an equivalent sum of current from all interconnected cells in one of the parallel-connected first groups of cells.

4. The system architecture of claim 1, further comprising a contactor adapted to interrupt current flow through the string in excess of 100,000 A.

5. The system architecture of claim 1, further comprising a fluid-based cooling system comprising a reservoir adapted to provide thermal storage capacity sufficient to time-shift the cooling of the coolant reservoir to a time of day when ambient temperatures are lower and the thermal gradient higher than ambient temperature and thermal gradient available at the time the grid battery energy storage system is cooled by the cooling system.

6. The system architecture of claim 5, further comprising a fire suppression system integrated with one or more components of the cooling system.

7. The system architecture of claim 1, further comprising one or more circuits adapted to transmit cell information through one or more wireless electromagnetic transmissions from one or more circuits that monitor and manage each of the parallel-connected first groups of cells to a centralized battery management system.

8. The system architecture of claim 1, further comprising one or more circuits adapted to transmit commands through one or more wireless electromagnetic transmissions from a centralized battery management system to circuits that monitor and manage each of the parallel-connected first groups of cells.

9. An improved system architecture for a grid battery energy storage system, comprising:
- a first level of modularity in which 18 or more cells are connected in parallel to form a first group of cells, to reduce a variability of a performance characteristic of the first group of cells to less than or equal to $[1/\sqrt{N}]$ % of a variability of the performance characteristic between individual cells in the first group of cells;
- the performance characteristic is one characteristic selected from a group of characteristics, including: capacity, impedance, cycle life, cycle life uniformity, ac resistance, and dc resistance;
- a cross-connection busbar configured to connect two or more parallel-connected first groups of cells;
- a second level of modularity in which a string of two or more first groups of cells connected in series to form a second group of cells;
- a cooling system that comprises (i) a cooling plate in thermal contact with individual cells and (ii) a pump and a liquid distribution system to ensure uniform temperature among cooling plates within the cooling system; and
- the grid battery energy storage system is adapted to be connected to supply or store electrical energy.

10. The system architecture of claim 9, wherein 30 or more cells are connected in parallel to form the first group of cells.

11. The system architecture of claim 9, further comprising cross-connection busbars that can be scaled to connect any number of N cells in the parallel connected first groups of cells.

12. The system architecture of claim 11, wherein a weight of the cross-connection busbar is lower than that of a busbar which would have been needed to carry an equivalent sum of current from all interconnected cells in a parallel-connected first group of cells.

13. The system architecture of claim 9, further comprising a contactor adapted to interrupt current flow through the string in excess of 100,000 A.

14. The system architecture of claim 9, further comprising a fluid-based cooling system comprising a coolant reservoir adapted to provide thermal storage capacity sufficient to time-shift a process of cooling of the coolant reservoir to a time of day when it is more efficient to do so.

15. The system architecture of claim 14, further comprising a fire suppression system integrated with one or more components of the cooling system.

16. The system architecture of claim 9, further comprising one or more circuits adapted to transmit cell information through one or more wireless electromagnetic transmissions from circuits that monitor and manage each of the parallel-connected first groups of cells to a centralized battery management system.

17. The system architecture of claim 9, further comprising one or more circuits adapted to transmit commands through one or more wireless electromagnetic transmissions from a centralized battery management system to circuits that monitor and manage each of the parallel-connected first groups of cells.

* * * * *